US012291118B2

(12) United States Patent
Wiegman

(10) Patent No.: US 12,291,118 B2
(45) Date of Patent: May 6, 2025

(54) SYSTEM AND METHOD FOR MANAGING RESIDUAL ENERGY IN A CHARGING COMPONENT

(71) Applicant: BETA AIR, LLC, South Burlington, VT (US)

(72) Inventor: Herman Wiegman, South Burlington, VT (US)

(73) Assignee: BETA AIR, LLC, Albany, NY (US)

( * ) Notice: Subject to any disclaimer, the term of this patent is extended or adjusted under 35 U.S.C. 154(b) by 288 days.

(21) Appl. No.: 17/966,069

(22) Filed: Oct. 14, 2022

(65) Prior Publication Data

US 2023/0136431 A1 May 4, 2023

Related U.S. Application Data

(63) Continuation-in-part of application No. 17/515,458, filed on Oct. 30, 2021, now Pat. No. 11,648,848.

(51) Int. Cl.
*B60L 53/60* (2019.01)
*B64C 29/00* (2006.01)
*G07C 5/00* (2006.01)
*H02J 7/00* (2006.01)

(52) U.S. Cl.
CPC ............ *B60L 53/60* (2019.02); *G07C 5/008* (2013.01); *H02J 7/0036* (2013.01); *H02J 7/0047* (2013.01); *B60L 2200/10* (2013.01); *B64C 29/0008* (2013.01)

(58) Field of Classification Search
None
See application file for complete search history.

(56) References Cited

U.S. PATENT DOCUMENTS

| 7,460,344 | B2* | 12/2008 | Hastings | H02H 7/18 |
| | | | | 361/42 |
| 7,478,692 | B2 | 1/2009 | Taue et al. | |
| 8,467,159 | B2 | 6/2013 | Jung et al. | |
| 8,725,330 | B2 | 5/2014 | Failing | |
| 8,736,226 | B2 | 5/2014 | Mukai et al. | |
| 10,114,058 | B2 | 10/2018 | Sun | |
| 10,183,585 | B2* | 1/2019 | Furuhashi | B60L 53/30 |
| 10,193,355 | B2 | 1/2019 | Ito et al. | |
| 10,581,256 | B2 | 3/2020 | Jung et al. | |
| 10,643,444 | B2 | 5/2020 | Kim et al. | |
| 10,649,040 | B2 | 5/2020 | Ollitrault et al. | |
| 10,775,872 | B2 | 9/2020 | Kim et al. | |

(Continued)

FOREIGN PATENT DOCUMENTS

EP 3069923 A1 9/2016

OTHER PUBLICATIONS

Waqas Khalid, Heejung Yu, Song Noh, Residual Energy Analysis in Cognitive Radios with Energy Harvesting UAV under Reliability and Secrecy Constraints, May 25, 2020.

*Primary Examiner* — Todd Melton
(74) *Attorney, Agent, or Firm* — Hoffman Warnick LLC

(57) ABSTRACT

A system and method for managing residual energy in a charging component is disclosed herein. Managing residual energy includes detecting an electrical parameter of the charging component and the electrically connected battery pack and generating a residual datum. The residual datum is transmitted to a computing device. The computing device identifies a residual element, generates an alert datum, and executes a security measure.

18 Claims, 12 Drawing Sheets

(56) References Cited

U.S. PATENT DOCUMENTS

| | | |
|---|---|---|
| 10,928,461 B1 | 2/2021 | Stafl |
| 10,948,545 B2 | 3/2021 | Mori |
| 11,046,188 B2 | 6/2021 | Mäki et al. |
| 11,190,030 B2 * | 11/2021 | Park .................. G01R 31/58 |
| 11,241,971 B2 | 2/2022 | Lee et al. |
| 2020/0164763 A1 | 5/2020 | Holme |
| 2021/0066934 A1 | 3/2021 | Sasaki |
| 2021/0141043 A1 | 5/2021 | Bertness |
| 2021/0339881 A1 | 11/2021 | Bevirt et al. |

\* cited by examiner

SYSTEM AND METHOD FOR MANAGING RESIDUAL ENERGY IN A CHARGING COMPONENT

CROSS-REFERENCE TO RELATED APPLICATIONS

This application is a continuation-in-part of Nonprovisional application Ser. No. 17/515,458 filed on Oct. 30, 2021 and entitled "SYSTEM AND METHOD FOR MANAGING RESIDUAL ENERGY FOR AN ELECTRIC AIRCRAFT," the entirety of which is incorporated herein by reference.

FIELD OF THE INVENTION

The present invention generally relates to the field of residual current detection. In particular, the present invention is directed to a system and method for managing residual energy in a charging component.

BACKGROUND

With the rise of electric vehicles, sufficient charging infrastructures and systems are required to maintain proper and continuous operation of electrical vehicles for a variety of commercial applications. In the process of charging an electric battery of an electric vehicle, it is critical to maintain the integrity of not only the electric vehicle, but also the electric charger. The monitoring and management of such a process involving large scale electrical vehicular devices require proper security protocols in the event of electrical hazards or potential electrical hazards compared to preventative devices existing for smaller electrical systems.

SUMMARY OF THE DISCLOSURE

In an aspect, a system for managing residual energy in a charging component includes a charging component electrically connected to a battery pack, a sensor communicatively connected to the charging component, wherein the sensor is configured to: detect an electrical parameter of the charging component and the electrically connected battery pack, and generate a residual datum as a function of the electrical parameter, a computing device communicatively connected to the charging component and the sensor, the computing device is configured to: receive the residual datum from the sensor, identify a residual element as a function of the residual datum, generate an alert datum as a function of the residual element, and execute a security measure as a function of the alert datum.

In another aspect, a method for managing residual energy in a charging component includes detecting, by a sensor communicatively connected to a charging component, an electrical parameter of the charging component and an electrically connected battery pack, generating, by the sensor, a residual datum as a function of the electrical parameter, receiving, by a computing device, the residual datum, identifying, by the computing device, a residual element as a function of the residual datum, generating, by the computing device, an alert datum as a function of the residual element, and executing, by the computing device, a security measure as a function of the alert datum These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
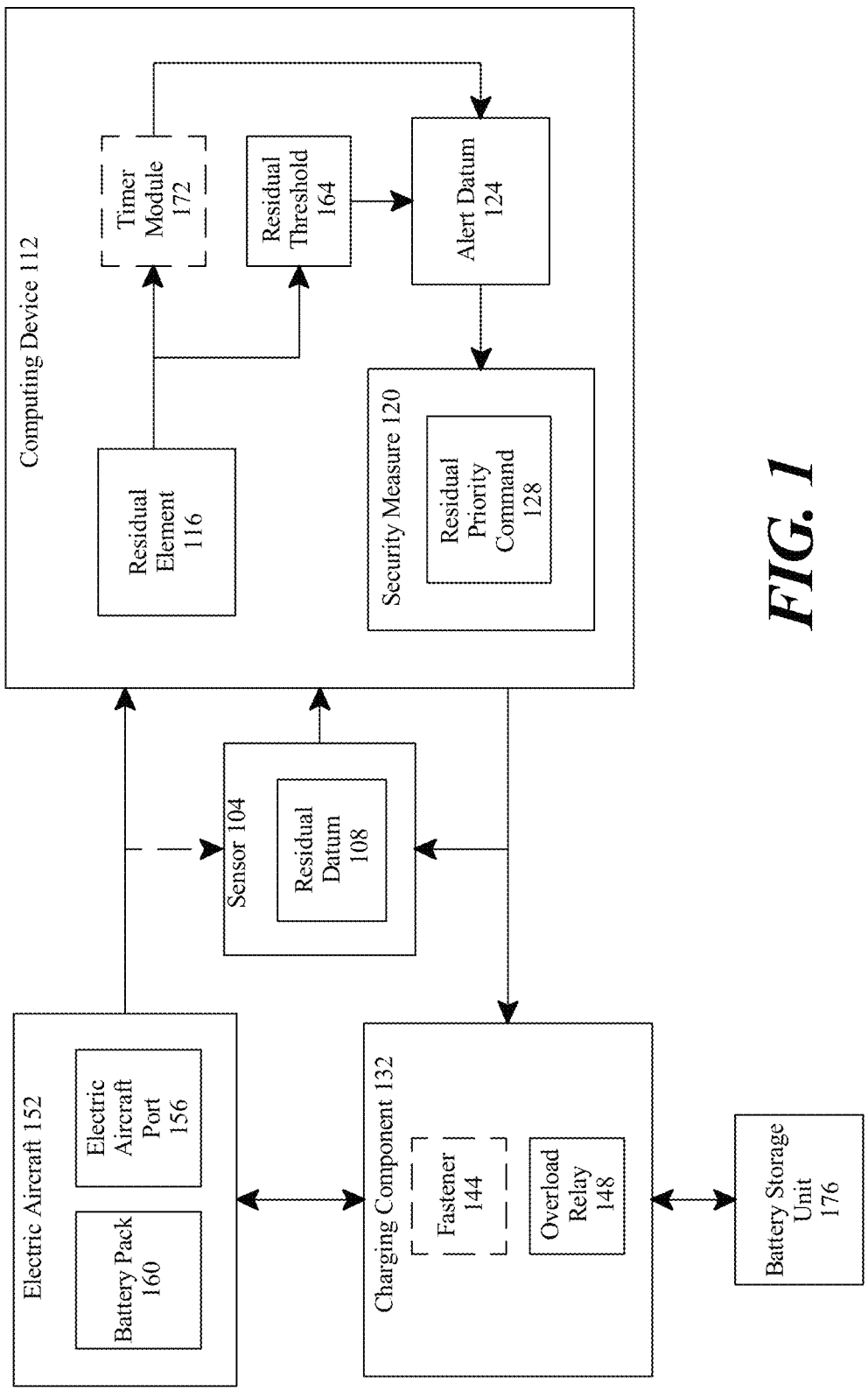
FIG. 1 is a block diagram of an exemplary embodiment of a system for managing residual energy for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

At a high level, aspects of the present disclosure are directed to systems and methods for managing residual energy for an electric aircraft. In an embodiment, aspects of the present disclosure can be used for any electric vehicles such as an electric aircraft, wherein the electric aircraft is an electric vertical take-off and landing vehicle. In an embodiment, aspects of the present disclosure can be used to detect any electrical abnormality such as a leakage current. This is so, at least in part, to assign various types of residual faults to a curated response, wherein the response is designed to alert any user or computing system and perform preventative measures to resolve the electrical abnormality or mitigate the damages caused by it.

Aspects of the present disclosure can be used to continuously monitor the process of an electrical charge and check if any spikes in electrical current, voltage, or any electrical outlier, calls for a security protocol. This is so, at least in part, to make sure that an instance of a sign indicating a residual current is serious enough to execute a security protocol. In an embodiment, a sensor may detect a leakage current, but the leakage current may return within a permissible safe limit, in which no drastic security protocol is required. This is so, at least in part, to prevent unnecessary and resource consuming measures in maximizing the safety and integrity of the system of the present disclosure.

Aspects of the present disclosure allow for human operators to physically perform the security measures in the instance a leakage current poses a serious danger. In another embodiment, aspects of the present disclosure can allow for automated or computing systems to execute electrical protocols and programs to fulfill a security protocol to prevent the threats caused by a leakage current. In an embodiment, aspects of the present disclosure can include, at least in part, a residual current device or a residual current circuit breaker. Exemplary embodiments illustrating aspects of the present disclosure are described below in the context of several specific examples.

Referring now to FIG. 1, an exemplary embodiment of a system 100 for a shutdown of an electric charger in response to a fault detection is illustrated. In a non-limiting embodiment, system 100 may be incorporated with a recharging station which includes a recharging landing pad and various infrastructure and/or equipment to support the functions of the components of system 100. A "recharging station," for the purpose of this disclosure, is an infrastructure that incorporates a plurality of equipment used to support the maintenance and charging of any electric vehicles. In a non-limiting embodiment, system 100 may be used for electric aircraft 152. For instance and without limitation, the recharging station may be consistent with the recharging station in U.S. patent application Ser. No. 17/373,863 and titled, "SYSTEM FOR CHARGING FROM AN ELECTRIC VEHICLE CHARGER TO AN ELECTRIC GRID," which is incorporated in its entirety herein. In a non-limiting embodiment, the recharging station may include any infrastructure that may support the landing, docking, charging, and the like thereof, of electric aircraft 152 or a plurality of electric aircrafts. The recharging station may include a docking terminal. A "docking terminal," for the purposes of this disclosure, refers to an infrastructure or hub used to hold an electric aircraft and/or connect electric devices. The docking terminal may include charging component 132 that may be connected to electric aircraft port 156 of electric aircraft 152. Persons skilled in the art, upon reviewing the entirety of this disclosure, will be aware of various embodiments of the recharging station that may house or support the use of charging component 132 for purposes as described. Charging component 132 is discussed in further detail below.

With continued reference to FIG. 1, in a non-limiting embodiment, system 100 may incorporate a recharging landing pad. A "recharging landing pad," for the purpose of this disclosure, is an infrastructure designed to support the landing and charging of a plurality of electric aircrafts. For instance and without limitation, the recharging landing pad may be consistent with the recharging landing pad in U.S. patent application Ser. No. 17/361,911 and title, "RECHARGING STATION FOR ELECTRIC AIRCRAFTS AND A METHOD OF ITS USE," which is incorporated in its entirety herein. Recharging landing pad may incorporate system 100 to charge electric aircrafts. In a non-limiting embodiment, sensor 104 may be disposed on recharging landing pad. For example and without limitation, sensor 104 may detect nearby electric aircrafts in the air which may be descending onto the electric aircraft. In a non-limiting embodiment, sensor 104 may be disposed on the recharging landing pad to detect, monitor, and maintain the descent, land, charging, and take-off of the electric aircraft onto the recharging pad. This is so, at least in part, to accurately measure the electric aircraft wherein sensor 104 is disposed on a location on the recharging landing pad that is ideal in connecting incoming electric aircrafts to the recharging landing pad for recharging. Persons skilled in the art, upon reviewing the entirety of this disclosure, will be aware of the various embodiments of the recharging landing pad and the configuration of the placement of sensor 104 for purposes as described herein.

Still referring to FIG. 1, system 100 includes computing device 112. In a non-limiting embodiment, computing device 112 may include a flight controller. For instance and without limitation, the flight controller may be consistent with the flight controller in U.S. patent application Ser. No. 17/348,916 and titled, "METHODS AND SYSTEMS FOR SIMULATED OPERATION OF AN ELECTRIC VERTICAL TAKE-OFF AND LANDING (EVTOL) AIRCRAFT," which is incorporated herein in its entirety. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include an electric vehicle. The electric vehicle may include any electrical vehicle in which persons skilled in the art, upon reviewing the entirety of this disclosure, will be aware of the various embodiments of an electric vehicle for purposes described in the entirety of this disclosure. In a non-limiting embodiment, the electrical vehicle may include electric aircraft 152. In a non-limiting embodiment, electric aircraft 152 may include an eVTOL aircraft, a drone, an unmanned aerial vehicle (UAV), a satellite, and the like thereof. Electric aircraft 152 may include battery pack 160 and electric aircraft port 156. Battery pack 156 may include a battery module or a plurality of battery modules configured to power to electric aircraft 152. In a non-limiting embodiment, battery pack 156 may be configured to be recharged by a recharging station as described herein. An "electric aircraft port," for the purpose of this disclosure, is an interface configured to mate with any connector for transferring electrical energy. In a non-limiting embodiment, electric aircraft port 156 may be connected to battery pack 160 wherein electric aircraft port 156 is configured to act as a medium for the transfer of electrical energy between battery pack 156 and any connector as described in the entirety of this disclosure.

With continued reference to FIG. 1, sensor 104 may include one or more sensors. As used in this disclosure, a "sensor" is a device that is configured to detect an input and/or a phenomenon and transmit information related to the detection. In a non-limiting embodiment, sensor 104 may be communicatively connected to charging component 132. "Communicatively connected", for the purposes of this disclosure, is two or more components electrically, or otherwise connected and configured to transmit and receive signals from one another. For example, and without limitation, a sensor may transduce a detected charging phenomenon and/or characteristic, such as, and without limitation, temperature, voltage, current, pressure, and the like, into a sensed signal. In one or more embodiments, and without limitation, sensor 104 may include a plurality of sensors. In one or more embodiments, and without limitation, sensor 104 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 104 may be a contact or a non-contact sensor. For instance, and without limitation, sensor 104 may be connected to electric aircraft 152, electric aircraft port 156, charging component 132, and/or a computing device 112. In other embodiments, sensor 104 may be remote to electric aircraft 152, electric aircraft port 156, charging component 132, and/or computing device 112. In a non-limiting embodiment, computing device 112 may include a pilot control, a controller, such as a flight controller, and the like thereof. In one or more embodiments, sensor 104 may transmit/receive signals to/from computing device 112. Signals may include electrical, electromagnetic, visual, audio, radio waves, or another undisclosed signal type alone or in combination.

With continued reference to FIG. 1, sensor 104 may include a clamp meter. In a non-limiting embodiment, the clamp meter may detect and measure a wide range of alternating or changing currents passing through a conductor under test. For example and without limitation, when telecommunications equipment is present, the value of leakage indicated by a clamp meter may be considerably more than that resulting from insulation impedance at 60 Hz. This is because telecommunications equipment typically incorporates filters that produce functional grounding currents and other equipment that produces harmonics, etc. You can only measure the characteristic leakage at 60 Hz by using a clamp meter that incorporates a narrow band-pass filter for removing currents at other frequencies. In a non-limiting embodiment, sensor 104 may include any meter specially designed for measuring leakage currents. The current flowing in the ground conductor is measured by connecting the meter in series with the grounding connection. In a non-limiting embodiment, for electrical devices incorporating a computing device, the ground connection is opened and the current flowing to the neutral side of the power line is measured. In another non-limiting embodiment, for electrical devices used for medical purposes, the current flowing to ground is measured. In a non-limiting embodiment, the meter may also be connected between the outputs of the power supply such as battery storage unit 176 and ground. In a non-limiting embodiment, charging component 132 may include a ground or connected to a ground. In another non-limiting embodiment, electric aircraft 152 may be connected to the same ground for purposes as described herein. In an embodiment, the meter may measure alternating currents by conducting a test, wherein the test conditions include swapping the ac line and neutral connections, and turning power switches off and on while monitoring the current. The test is performed after the equipment has warmed to normal operating temperature and, in some cases, following certain test that cause abnormally high temperatures within the equipment. This is so, at least in part, to identify and measure the worst-case leakage current. For very low leakage currents, the meter is replaced with a network consisting of either a resistor or a resistor and capacitor combination. The voltage drop across the network is then measured using a sensitive ac voltmeter. Ungrounded or double-insulated equipment is checked by connecting the meter between any touchable conductive part and ground. In the case of non-conductive housings, a copper foil of a specific size is placed on the housing, and the current flowing from it to ground is measured. Persons skilled in the art, upon reviewing the entirety of this disclosure, will be aware of the various embodiments of using a clamp meter for detecting and measuring residual element 116.

With continued reference to FIG. 1, sensor 104 may include a plurality of independent sensors, where any number of the described sensors may be used to detect any number of physical or electrical quantities associated with communication of the charging connection. Independent sensors may include separate sensors measuring physical or electrical quantities that may be powered by and/or in communication with circuits independently, where each may signal sensor output to a computing device 112 such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 104 to detect phenomenon may be maintained.

With continued reference to FIG. 1, sensor 104 may further include a sensor suite. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates residual datum 108 into at least an electronic signal configured to be transmitted to another electronic component.

With continued reference to FIG. 1, in one or more embodiments, sensor 104 may include electrical sensors. Electrical sensors may be configured to measure voltage across a component, electrical current through a component, and resistance of a component. In one or more embodiments, sensor 104 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 104, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection. In some embodiments, sensor 104 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in one or more embodiments, sensor 104 may include a sensor suite which may include a plurality of sensors that may detect similar or unique phenomena. For example, in a non-limiting embodiment, a sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a computing device 112 such as computing device 112. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained. In one or more embodiments, sensor 104 may include a sense board. A sense board may have at least a portion of a circuit board that includes one or more sensors configured to, for example, measure a temperature of battery pack 160 of electric aircraft 152, battery storage unit 176 incorporated with charging component 132, and the like thereof. In one or more embodiments, a sense board may be connected to one or more battery modules or cells of a power source. In one or more embodiments, a sense board may include one or more circuits and/or circuit elements, including, for example, a printed circuit board component. A sense board may include, without limitation, computing device 112 configured to perform and/or direct any actions performed by the sense board and/or any other component and/or element described in this disclosure. The computing device 112 may include any analog or digital control circuit, including without limitation a combinational and/or synchronous logic circuit, a processor, microprocessor, microcontroller, or the like.

With continued reference to FIG. 1, sensor 104 is configured to detect at least an electrical parameter of a charging component 132. An "electrical parameter," for the purpose of this disclosure, is a collection of information describing any events related to any electrical process involved in the charging of an electric device. In a non-limiting embodiment, the plurality of measured charge may include a collection of information describing the electric vehicle that may be charged. For example and without limitation, the plurality of measured charge may include, but not limited to, electric current, electric charge, electric voltage, battery temperature, and the like thereof. In a non-limiting embodiment, sensor 104 may be configured to capture any unusual data inputs such as, but not limited to, electric shock, electric overcharge, electric charge, a short connection and the like thereof. In an embodiment, sensor 104 may be configured to look for data inputs that may cause any abnormal events related to charging. For example and without limitation, sensor 104 may be configured to play closer attention to battery temperature, electric charge cycle, and the like thereof, which may be a catalyst for potential abnormal events. Persons skilled in the art, upon reviewing the entirety of this disclosure, will be aware of the various embodiments of charger related data for purposes described herein.

With continued reference to FIG. 1, sensor 104 may be configured to generate a residual datum 108 as a function of the at least an electrical parameter. A "residual datum," for the purpose of this disclosure, is any datum or element of data describing parameters captured by sensor 104 which may include a collection of information describing the patterns and factors of electrical energy involved with charging component 132, electric aircraft 152, or the process of charging. In a non-limiting embodiment, residual datum 108 may be a standardized collection of data of the at least an electrical parameter, wherein residual datum 108 may include a plurality of categories denoting information about electric aircraft 152, battery pack 160, charging component 132, and the like thereof. For example and without limitation, residual datum 108 may include, but is not limited to, battery quality, battery life cycle, remaining battery capacity, electric current, electric voltage, pressure, temperature, moisture level, and the like. In a non-limiting embodiment, residual datum 108 may include any data captured by any sensor as described in the entirety of this disclosure. Additionally and alternatively, residual datum 108 may include any element or signal of data that represents an electric aircraft route and various environmental or outside parameters. In a non-limiting embodiment, residual datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, sensor 104 may receive a battery pack datum from electric aircraft 152. The battery pack datum may be part of residual datum 108. A "battery pack datum," for the purpose of this disclosure, is a collection of information describing one or more characteristics corresponding to at least a portion of a battery pack of an electric aircraft and/or its components. Sensor 104 may be configured to detect an electrical parameter from battery pack 160 as a part of residual datum 108. In a non-limiting embodiment, the battery pack datum may include any data and/or information about the state of the battery pack. the battery pack datum may include information about the make and model of the battery pack, rate of recharge of the battery pack, rate of discharge of the battery pack, and the like thereof. This is so, at least in part, to provide information that may be used to charge the electric aircraft with a compatible electric charging device and optimal amount of electric energy. In a non-limiting embodiment, the battery pack datum may be generated by a sensor communicatively connected to battery pack 160 and transmitted to sensor 104 and/or computing device 112. Persons skilled in the art, upon reviewing the entirety of this disclosure, will be aware of the various battery information used for charging and purposes as described herein.

With continued reference to FIG. 1, residual datum 108 may include information indicative of the location of charging component 132 relative to electric aircraft port 156. In a non-limiting embodiment, sensor 104 may detect the proximity of electric aircraft port 132 relative to charging component 132 of the recharging landing pad of system 100. For example and without limitation, sensor 104 disposed on charging component 132 may detect if electric aircraft 152 and its electric aircraft port 156 are within a certain distance for charging component 132 to physically form a connection with electric aircraft port 156 to transfer electric energy. In a non-limiting embodiment, sensor 104 may be disposed onto an infrastructure designed to support the landing and charging of a plurality of electric aircrafts. "Disposed," for the purpose of this disclosure, is the physical placement of a computing device on an actuator. In another non-limiting example, residual datum 108 may inform computing device 112 if electric aircraft 152 is too far for charging component 132 to reach electric aircraft port 156 of electric aircraft 152, wherein computing device 112 may generate an alert to inform any personnel or electric aircraft 152 of the situation. Persons skilled in the art, upon reviewing the entirety of this disclosure, will be aware of the various embodiments of proximity data for accurate and safe charging and connection for purposes as described herein.

With continued reference to FIG. 1, residual datum 108 may include a battery parameter set. A "battery parameter set," for the purpose of this disclosure, is an element of data representing physical values and/or identifiers of an electric aircraft, the electric aircraft's actuators and/or flight components, and the electric aircraft's charging components. For instance and without limitation, the battery parameter set may be consistent with the battery parameter set in U.S. patent application Ser. No. 17/407,518 and titled, "SYSTEM AND METHOD FOR COMMUNICATING A PRE-CHARGING PACKAGE STREAM OF AN ELECTRIC AIRCRAFT," which is incorporated in its entirety herein. For example and without limitation, electric aircraft 152 may generate its own battery parameter set in which the pilot of electric aircraft 152 may transmit the battery parameter set to computing device 112, which may be first received and/or detected by sensor 104, through any means of digital communication, which may include being connected to a network, in order for computing device 112 to generate security measure 120 for electric aircraft 152. This is so, at least in part, to provide computing device 112 useful information in generating security measure 120 tailored to electric aircraft 152 or to any other electric aircraft.

With continued reference to FIG. 1, the battery parameter set may include a datum including battery parameters. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor may include circuitry, computing devices, electronic components or a combination thereof that translates any datum into at least an electronic signal configured to be transmitted to another electronic component. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The battery parameter set may include a plurality of individual battery parameters. A "battery parameter," for the purposes of this disclosure, refers to a measured value associated with electric aircraft 152 its battery pack. Battery parameter may include a state of charge of the battery pack. A "state of charge," for the purposes of this disclosure, refers to the level of charge of the electric battery relative to its capacity. Battery parameter may include a charge cycle. A "charge cycle," for the purposes of this disclosure, refers the process of charging a rechargeable battery and discharging it as required into a load. The term is typically used to specify a battery's expected life, as the number of charge cycles affects life more than the mere passage of time. A person of ordinary skill in the art, after viewing the entirety of this disclosure, would appreciate the plurality of measured values in the context of battery charging.

With continued reference to FIG. 1, the battery parameter set may include at least a charge requirement. A "charge requirement", for the purpose of this disclosure, refers to an element of data representing physical or electronic values that identify compatible parameters for charging. The at least charge requirement may include, but not limited to, battery capacity of the electric aircraft, battery charge cycle, maximum battery capacity, minimum battery capacity, and the like thereof. The at least a charge requirement may include a plurality of maximum charge current for a plurality of battery types. In a non-limiting embodiment, charge requirement may include a minimum charge current to be 15% to 25% of the maximum battery capacity of a battery pack of electric aircraft 152. In a non-limiting embodiment, the at least a charge requirement may include a maximum charging current to be 50% for a gel battery, 50% for an AGM battery and the like thereof. In a non-limiting embodiment, the at least a charge requirement may include a plurality of different types of chargers designated for different types of electric aircrafts, different types of electric aircraft batteries, and different types of charging.

With continued reference to FIG. 1, in a non-limiting embodiment, the at least charge requirement may include a classification label for type of charger to be used on a battery pack in which the battery pack is assigned a classification label based on the quality of life of the battery pack. For example and without limitation, electric aircraft 152 with a low level classification level may denote a level 1 charger to be used which may be included in the battery parameter set. For instance, a battery pack with a degraded quality of life and/or smaller capacitive load may be designated a level 1 charger configured to slowly charge the battery pack to avoid exposure to high electric current that may lead to considerable stress or damage to the battery pack and electric aircraft 152. For example and without limitation, the battery pack may be designated to a low level classification label as a function of the priority of the charging of the electric aircraft. In a non-limiting embodiment, the battery parameter set may include information regarding the type of travel of an electric aircraft. For example and without limitation, if electric aircraft 152 is intended to fly a low priority flight, the battery parameter set may denote a low level classification label to the electric aircraft 152 in which a level 1 charger may be assigned to charge electric aircraft 152. For example and without limitation, the at least a charge requirement of the battery parameter set for electric aircraft 152 may include a charge duration of 40 hours. In a non-limiting embodiment, a battery pack of electric aircraft 152 may be classified with an average level classification label and denote the use of a level 2 charger. For example and without limitation, electric aircraft 152 intended for a long flight may denote a level 2 charger and average level classification label in which the battery parameter set may denote such information and designate a level 2 charger to better charge the electric aircraft 152 as a result of the battery parameter set. For example and without limitation, the battery parameter set denoting an average level classification label may include the at least a charge requirement containing a charge rate of 6 kW. In a non-limiting embodiment, the battery parameter set for electric aircraft with an average level classification label may include a charge duration of 6 hours. In a non-limiting embodiment, a high level classification label may be assigned to an electric aircraft 152 and denote a level 5 charger for high priority flights. In a non-limiting embodiment, a high level classification label may be assigned to electric aircraft 152 with a battery pack containing a high capacitive load which may endure fast electrical current. For example and without limitation, electric aircraft 152 that may be intended to fly important persons or emergency flights may denote a high level classification label in which the battery parameter set may assign the electric aircraft to a level 5 charger for fast charging of electric aircraft 152. For example and without limitation, High level classification label may include the at least a charge requirement containing a charge rate of 50-60 kW. In a non-limiting embodiment, the battery parameter set for an electric aircraft with a high level classification label may include a charge duration of 2 hours. A person of ordinary skill in the art, after viewing the entirety of this disclosure, would appreciate the charge requirement identifying an electric aircraft in the context of batteries.

With continued reference to FIG. 1, the battery parameter set further includes at least a charging parameter. A "charging parameter," for the purposes of this disclosure, refers to a measure value associate with the charging of a power source of an electric aircraft. At least a charging parameter may include any data associated with charging of the battery of an electric aircraft. For example and without limitation, at least a charging parameter may include a target charge voltage for the battery, battery capacity, maximum charging time, and the like. In a non-limiting embodiment, the charging parameter may denote a specific type of charging and charger associated with the electric vehicle. For example and without limitation, electric aircraft 152 may be assigned to a trickle charging in which electric aircraft 152 is configured to receive a trickle charge. In a non-limiting embodiment, charging parameter may include a classification label as described in the entirety of this disclosure. In a non-limiting embodiment, charging parameter may include a plurality of data describing battery parameters including, but not limited to, battery type, battery life cycle, and the like thereof. For example and without limitation, battery parameter may include a life cycle of 5 years. For example and without limitation, battery parameter may include battery types such as, but not limited to, lead acid, nickel cadmium (NiCd), nickel-metal hydride (Ni-MH), lithium-ion/lithium polymer, lithium metal, and the like thereof. In a non-limiting embodiment, battery parameter may include a plurality of threats associated with a battery pack. For example and without limitation, the battery parameter set may include threats such as, but not limited to, battery leakage, battery overcharging, excessive battery charging rate, excessive battery discharge rate, battery bus fault, and the like thereof.

Still referring to FIG. 1, for instance, and without limitation, sensor 104 may detect a connection status, which may be detected as part of residual datum 108. A "connection status," for the purpose of this disclosure, is a determination of a presence of a connection is present, established, and/or disconnected between charging component 132 and electric aircraft 152 and/or electric aircraft port 156. For example and without limitation, the connection status may include a boolean classification denoting that a connection is made or not. In another non-limiting example, the connection status may include a status of "pending" wherein sensor 104 recognizes that a connection is to be made and monitors the process of establishing a connection between charging component 132 and electric aircraft 152 and its electric aircraft port 156. In a non-limiting embodiment, the connection status may include a status of "connected," denoting that a connection has been successfully established. For example and without limitation, sensor 104 may monitor the connecting process and transmit a confirmation signal to computing device 112 that the connection is valid and successfully made. In another non-limiting embodiment, the connection status may include a status of "disconnected," denoting that a connection has been properly and/or successfully disconnected between charging component 132 and electric aircraft 152 and its electric aircraft port 156. For example and without limitation, after the completion of a successful action by charging component 132 and electric aircraft 152, the connection between them may be disconnected to ensure the completion of a charging process. A "charging process," for the purposes of this disclosure, is any process of electrical energy transfer between two or more electrical devices. In a non-limiting embodiment, the charging process may include charging component 132 power electric aircraft 152 and its battery pack. For example and without limitation, charging component 132 may use its own source and/or storage of electrical energy such as battery storage unit 176 to power the battery pack of electric aircraft 152.

Still referring to FIG. 1, system 100 may include charging component 132. In a non-limiting embodiment, sensor 104 may be disposed onto charging component 132. In another non-limiting embodiment, charging connector may be electrically connected to computing device 112. A "charging component," for the purpose of this disclosure, is any physical connector used as a hub of transfer for electrical energy which may include a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For instance and without limitation, charging component 132 may be consistent with the charging connector in U.S. patent application Ser. No. 17/407,518 and titled, "SYSTEM AND METHOD FOR COMMUNICATING A PRE-CHARGING PACKAGE STREAM OF AN ELECTRIC AIRCRAFT," which is incorporated in its entirety herein. In a non-limiting embodiment, charging component 132 may connect to the electric aircraft 152 via electric aircraft port 156. An "electric aircraft port," for the purpose of this disclosure, is an interface configured to mate with any connector for transferring electrical energy. For example and without limitation, sensor 104 may be attached onto charging component 132 to better detect location relativity of charging component 132 to electric aircraft port 156. In a non-limiting embodiment, charging component 132 may mate with electric aircraft port 156 as a function of sensor 104 disposed onto charging component 132 and forming a physical connection and/or mechanical connection. In a non-limiting embodiment, charging component 132 may include a male component having a penetrative form and port may include a female component having a receptive form, receptive to the male component. Alternatively or additionally, charging component 132 may have a female component and port may have a male component. In some cases, connector may include multiple connections, which may make contact and/or communicate with associated mating components within port, when the connector is mated with the port. In a non-limiting embodiment, charging component 132 may include a housing. As used in this disclosure, a "housing" is a physical component within which other internal components are located. In some cases, internal components with housing will be functional while function of housing may largely be to protect the internal components. The housing and/or connector may be configured to mate with a port, for example an electric aircraft port 156. As used in this disclosure, "mate" is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of charging component 132. In some cases, mate may be lockable. As used in this disclosure, an "electric vehicle" is any electrically power means of human transport, for example without limitation an electric aircraft or electric vertical take-off and landing aircraft. In some cases, an electric vehicle will include a battery pack configured to power at least a motor configured to move the electric aircraft 152. In a non-limiting embodiment, electric aircraft port 156 may be configured to support bidirectional charging. A "bidirectional charging," for the purpose of this disclosure, is a charging that allows for the flow of electricity to go two ways. In a non-limiting embodiment, charging component 132 may provide electric energy to the battery pack of an electric aircraft from a power source such as an electric grid and also receive electric energy from an electric aircraft and its battery pack. For example and without limitation, electric aircraft port 156 may act as a hub for the transfer of electrical energy. In a non-limiting embodiment, electric aircraft port 156 may be integrated into a system supporting vehicle-to-grid (V2G) charging. For example and without limitation, electric aircraft port may be used to transfer electric energy from the battery pack of an electric aircraft 152 to charge a power source and/or battery pack of a charging component 132. Charging component 132 may include a universal charger and/or common charger. For example and without limitation, charging component 132 may draw power from a variety of input voltages. Persons skilled in the art, upon reviewing the entirety of this disclosure, will be aware of various configurations of the electric aircraft port 156 that may be utilized for various charging methodologies consistent with this disclosure.

Still referring to FIG. 1, charging component 132 may be configured to charge and/or recharge a plurality of electric aircrafts at a time using at least any charger as described in the entirety of this disclosure. As used in this disclosure, "charging" is a process of flowing electrical charge in order to increase stored energy within a power source. In one or more non-limiting exemplary embodiments, a power source includes a battery and charging includes providing an electrical current to the battery. In some embodiments, charging component 132 may be constructed from any of variety of suitable materials or any combination thereof. In some embodiments, charger 104 may be constructed from metal, concrete, polymers, or other durable materials. In one or more embodiments, charging component 132 may be constructed from a lightweight metal alloy. The charging pad may include a landing pad, where the landing pad may be any designated area for the electric vehicle to land and/or takeoff. In one or more embodiments, landing pad may be made of any suitable material and may be any dimension. In some embodiments, landing pad may be a helideck or a helipad. In a non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charger 104 or within communication with charger 104 are configured to affect electrical recharging current according to control signal from, for example, a controller. For instance, and without limitation, a controller may control at least a parameter of the electrical charging current. For example, in some cases, controller may control one or more of current (Amps), potential (Volts), and/or power (Watts) of electrical charging current by way of control signal. In some cases, controller may be configured to selectively engage electrical charging current, for example ON or OFF by way of control signal.

With continued reference to FIG. 1, charging component 132 may be supplied by battery storage unit 176. A "battery storage unit," for the purposes of this disclosure, refer to a device or station that may include a plurality of batteries to be used to store electrical energy. In a non-limiting embodiment, battery storage unit 176 may be a part of charging component 132. In another non-limiting embodiment, battery storage unit 176 may be located in a remote location relative to charging component 132 wherein charging component 132 may charge the battery pack of electric aircraft 152 using the power stored in battery storage unit 176. For instance and without limitation, battery storage unit 176 may be consistent with the battery storage system in U.S. patent application Ser. No. 17/373,863 and titled, "SYSTEM FOR CHARGING FROM AN ELECTRIC VEHICLE CHARGER TO AN ELECTRIC GRID," which is incorporated in its entirety herein. Any electrical device and/or electrical vehicle may be charged from a power source such as battery storage unit 176.

With continued reference to FIG. 1, charging component 132 and/or housing of connector may include fastener 144. As used in this disclosure, a "fastener" is a physical component that is designed and/or configured to attach or fasten two (or more) components together. Charging component 132 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 5M DUAL LOCK fasteners manufactured by 5M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electromagnet. Fastener 144 may be configured to provide removable attachment between charging component 132 and at least a port, for example electric aircraft port 156. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1, charging component 132 may include a charger. A "charger," for the purposes of this disclosure, refers to an electric device that serves as a medium to provide electricity to a battery by a charge connection. The charger may include, but not limited to, a constant voltage charger, a constant current charger, a taper current charger, a pulsed current charger, a negative pulse charger, a dumb charger, a fast charger, a smart charger, an IUI charger, a bidirectional charger, a trickle charger and/or a float charger. In a non-limiting embodiment, a recharging station may be configured to support bidirectional charging as a function of the charger. Bidirectional charging may include the transfer of electrical energy that goes two ways: from an electric grid to an EV battery or from an EV battery to an electric grid. In a non-limiting embodiment, charging station may perform bidirectional charging via the connection between charging component 132 and electric aircraft port 156. In a non-limiting embodiment, charging station may automatically connect the charger to electric aircraft port 156. In a non-limiting embodiment, the charger is mechanically coupled to a docking terminal and protruded outward for a user to manually adjust and connect to electric aircraft port 156 of electric aircraft 152. In a non-limiting embodiment, the charger may lock itself via the charging station if the connection between electric aircraft 152 and charging component 132 is not formed or detected. For instance, the charger may be configured to remain locked and unusable unless an electric aircraft nearby requires charging and forms a charge connection. In a non-limiting embodiment, the charger may be unlocked to allow for use in the charging of an electric aircraft or the receiving of electric power from the electric aircraft when a charge connection is detected and/or formed. In a non-limiting embodiment, charger may incorporate a timer that is configured to allow for an electric aircraft to use the charger for the duration of the timer. For instance, once a charge connection is detected and/or formed and the electric aircraft is physically linked with the charger, a timer may begin to countdown in which the aircraft may utilize the charger before the timer runs out and the charger becomes locked. A person of ordinary skill in the art, after viewing the entirety of this disclosure, would appreciate the various charging capabilities that may be conducted.

With continued reference to FIG. 1, charging component 132 may include a power converter. As used in this disclosure, a "power converter" is an electrical system and/or circuit that converts electrical energy from one form to another. For example, in some cases power converter may convert alternating current to direct current, and/or direct current to alternating current. In some cases, power converter may convert electrical energy having a first potential to a second potential. Alternative or additionally, in some cases, power converter may convert electrical energy having a first flow (i.e., current) to a second flow. As used in this disclosure, an "alternating current to direct current converter" is an electrical component that is configured to convert alternating current to digital current. An alternating current to direct current (AC-DC) converter may include an alternating current to direct current power supply and/or transformer. In some cases, the AC-DC converter may be located within an electric aircraft 152 and conductors may provide an alternating current to the electric aircraft by way of at least a charger. Alternatively and/or additionally, in some cases, AC-DC converter may be located outside of electric vehicle and an electrical charging current may be provided as a direct current to electric aircraft 152, by way of at least a charger. In some cases, AC-DC converter may be used to recharge the battery pack of electric aircraft 152. In some embodiments, power converter may have a connection to a grid power component, for example by way of at least a charger. Grid power component may be connected to an external electrical power grid. In some embodiments, grid power component may be configured to slowly charge one or more batteries in order to reduce strain on nearby electrical power grids. In one embodiment, grid power component may have an AC grid current of at least 250 amps. In some embodiments, grid power component may have an AC grid current of more or less than 250 amps. In one embodiment, grid power component may have an AC voltage connection of 280 Vac. In other embodiments, grid power component may have an AC voltage connection of above or below 280 Vac. In some embodiments, charging station may provide power to the grid power component by the electric energy stored in its own battery pack of charging component 132 or the battery pack of an electric aircraft. In this configuration, charging station may provide power to a surrounding electrical power grid.

With continued reference to FIG. 1, in some cases, the power converter may include one or more direct current to direct current (DC-DC) converters. DC-DC converters may include without limitation any of a linear regulator, a voltage regulator, a motor-generator, a rotary converter, and/or a switched-mode power supply. In some cases, power converter may include a direct current to alternating current (DC-AC) converter. DC-AC converters may include without limitation any of a power inverter, a motor-generator, a rotary converter, and/or a switched-mode power supply. In some cases, power converter may include one or more alternating current to direct current (AC-DC) converters. AC-DC converters may include without limitation any of a rectifier, a mains power supply unit (PSU), a motor-generator, a rotary converter, and/or a switched-mode power supply. In some cases, power converter may include one or more alternating current to alternating current (AC-AC) converters. AC-AC converters may include any of a transformer, autotransformer, a voltage converter, a voltage regulator, a cycloconverter, a variable-frequency transformer, a motor-generator, a rotary converter, and/or a switched-mode power supply. In some cases, power converter may provide electrical isolation between two or more electrical circuits, for example battery pack 116 and charger. In some cases, power converter may provide a potential (i.e., voltage) step-down or step-up. In some embodiments, power converter may receive an alternating current and output a direct current. In some embodiments, power converter may receive a potential within a range of about 100 Volts to about 500 Volts. In some embodiments, power converter may output a potential within a range of about 200 Volts to about 600 Volts. In some embodiments, power converter may receive a first potential and output a second potential at least as high as the first potential. In some embodiments, power converter may be configured to receive a first current from a power source including a "Level 2" charger, such that the first current consists of an alternating current having a potential of about 240 Volts or about 120 Volts and a maximum current no greater than about 30 Amps or no greater than about 20 Amps. In some embodiments, power converter may be configured to output a second current which is comparable to that output by a "Level 5" charger, such that the second current consists of a direct current having a potential in a range between about 200 Volts and about 600 Volts.

With continued reference to FIG. 1, charging component 132 may include one or more conductors configured to conduct, for example, a direct current (DC) or an alternating current (AC), and the like thereof. In a non-limiting embodiment, the conductor may be configured to charge or recharge, for example, the battery pack of the electric aircraft. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor may be configured to charge and/or recharge an electric vehicle. For instance, conductor may be connected to the battery pack of electric aircraft 152 and/or battery storage unit 176 of charging component 132. The conductor may be designed and/or configured to facilitate a specified amount of electrical power, current, or current type. For example, a conductor may include a direct current conductor. As used in this disclosure, a "direct current conductor" is a conductor configured to carry a direct current for recharging the battery pack of electric aircraft 152. As used in this disclosure, "direct current" is one-directional flow of electric charge. In some cases, a conductor may include an alternating current conductor. As used in this disclosure, an "alternating current conductor" is a conductor configured to carry an alternating current for recharging the battery pack of electric aircraft 152. As used in this disclosure, an "alternating current" is a flow of electric charge that periodically reverse direction; in some cases, an alternating current may change its magnitude continuously with in time (e.g., sine wave). In a non-limiting embodiment, charging component 132 may include a ground conductor. A "ground conductor," for the purpose of this disclosure, is a conductor or a system or that is intentionally grounded. In a non-limiting embodiment, the ground conductor may include any suitable conductor configured to be in electrical communication with a ground. In a non-limiting embodiment, a ground is a reference point in an electrical circuit, a common return path for electric current, or a direct physical connection to the earth. The ground may include an absolute ground such as earth or ground may include a relative (or reference) ground, for example in a floating configuration. The ground conductor functions to provide a grounding or earthing path for any abnormal, excess or stray electricity. In a non-limiting embodiment, charging component 132 may include a control signal conductor configured to conduct a control signal. A "control signal conductor," for the purpose of this disclosure, is a conductor configured to carry a control signal between charging component 132 and computing device 112. The control signal is an electrical signal that is indicative of information. The control signal may include, for example, an analog signal, a digital signal, or the like.

With continued reference to FIG. 1, sensor 104 may recognize that a charging connection has been created between charging component 132 and electric aircraft 152 and its electric aircraft port 156 that facilitates communication between charging component 132 and electric aircraft 152. For example, and without limitation, sensor 104 may identify a change in current through a charging connector of charging component 132, indicating the charging connector is in electric communication with, for example, a port of electric aircraft 152, as discussed further below. For the purposes of this disclosure, a "charging connection" is a connection associated with charging a power source, such as, for example, a battery. The charging connection may be a wired or wireless connection, as discussed further below in this disclosure. The charging connection may include a communication between charging component 132 and electric aircraft 152. For example, and without limitation, one or more communications between charging component 132 and electric aircraft 152 may be facilitated by the charging connection. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charging component 132 and electric aircraft 152 may include an electric communication. As used in this disclosure, a "fluidic communication" is an attribute wherein two or more relata interact with one another by way of a fluidic flow or fluid in general. For example, and without limitation, a coolant may flow between charging component 132 and electric aircraft 152 when there is a charging connection between charging component 132 and electric aircraft 152. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity). In one or more embodiments, communication of the charging connection may include various forms of communication. For example, and without limitation, an electrical contact without making physical contact, for example, by way of inductance, may be made between charging component 132 and electric aircraft 152 to facilitate communication. Exemplary conductor materials include metals, such as without limitation copper, nickel, steel, and the like. In one or more embodiments, a contact of charging component 132 may be configured to provide electrical communication with a mating component within a port of electric aircraft 152. In one or more embodiments, contact may be configured to mate with an external connector. As used in this disclosure, a "charging connector" is a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For example, in the case of an electric vehicle port, the port interfaces with a number of conductors and/or a coolant flow path by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 1, sensor 104 may be configured to transmit any datum detected such as, but not limited to, residual datum 108, to computing device 112. In a non-limiting embodiment, computing device 112 may be connected to a network. A "network", for the purpose of this disclosure, is any medium configured to facilitate communication between two or more devices. The network may include, but not limited to, an artificial neural network, wireless network, radio network, electrical network, broadcast network, and the like thereof. In a non-limiting embodiment, the network may be a public network in which any electric aircraft that may fly within its range may be informed of the recharging station. In another non-limiting embodiment, a plurality of electric aircrafts that fly within the range of the network may be aware of each other's location and communicate via the network using any means of connection such as Wi-Fi, Bluetooth, radio transmission, and the like thereof. In a non-limiting embodiment, the network may be a private network in which the electric aircraft must request access to connect to the network and access the recharging station or other electric aircrafts that are within the network. In a non-limiting embodiment, the network may include a mesh network. The mesh network may include an avionic mesh network. The mesh network may include, without limitation, an avionic mesh network. For instance and without limitation, the avionic mesh network may be consistent with the avionic mesh network in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. In some cases, the network may communicate encrypted data. As used in this disclosure, "encrypted data" is any communicable information that is protected or secured by any method, including obfuscation, encryption, and the like. Encrypted data may include information protected by any cryptographic method described in this disclosure. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. In a non-limiting embodiment, computing device 112 may receive datum from an airborne electric aircraft that is connected to the network and/or within the range of the network. For example and without limitation, electric aircraft 152 that comes within the range of the network may digitally transmit data about the aircraft and its battery recharging needs. This is so, at least in part, for computing device 112 to generate security measure 120 in advanced before the occurrence of alert datum 124. Persons skilled in the art, upon reviewing the entirety of this disclosure, will be aware of the various digital communication and transmissions used for the purpose described herein.

With continued reference to FIG. 1, computing device 112 may be configured to receive residual datum 108. In a non-limiting embodiment, computing device 112 may include one or more circuit elements, computing devices, FGPAs, or other electronic devices. Any module as described herein, may be created using any combination of hardware and/or software logic commands, and may be physically or conceptually separate from or merged with any other such module, as persons skilled in the art will appreciate upon reviewing the entirety of this disclosure. In a non-limiting embodiment, computing device 112 may include a plurality of physical controller area network buses, wherein the plurality of physical controller area network buses are communicatively connected to computing device 112. In a non-limiting embodiment, electric aircraft 152 may include a plurality of physical controller are network buses communicatively connected to electric aircraft 152. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. For instance and without limitation, the physical controller area network bus unit may be consistent with the physical controller area network bus unit in U.S. patent application Ser. No. 17/218,342 and titled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein in its entirety. In a non-limiting embodiment, the physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. A plurality of physical CAN bus units may be located physically at electric aircraft 152 and/or computing device 112, wherein the hardware of the physical CAN bus unit may be integrated within the infrastructure of electric aircraft 152 and/or computing device 112. In an embodiment, communicative connection includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, optical coupling, or the like. The physical CAN bus units may be mechanically connected to each other within the aircraft wherein the physical infrastructure of the device is integrated into the aircraft for control and operation of various devices within the electric aircraft 152 and/or computing device 112. The physical CAN bus unit may be communicatively connected with each other and/or to one or more other devices, such as via a CAN gateway. Communicatively connecting may include direct electrical wiring, such as is done within automobiles and aircraft. Communicatively connecting may include infrastructure for receiving and/or transmitting transmission signals, such as with sending and propagating an analogue or digital signal using wired, optical, and/or wireless electromagnetic transmission medium.

With continued reference to FIG. 1, computing device 112 may be configured to identify a residual element 116 as a function of residual datum 108. A "residual element," for the purpose of this disclosure, is any instance within a collection of data that may represent an abnormality of an electric current. In a non-limiting embodiment, residual element 116 may include any moment that may be hazardous to any equipment and/or infrastructure involved in any charging process. For example and without limitation, residual element 116 may include an electrical abnormality. An "electrical abnormality," for the purpose of this disclosure, is any fault or fault current associated with at least an electric current. For example and without limitation, the electrical abnormality may include a short circuit which may include a fault in which a live wire touches a neutral or ground wire. This may be detected in an event a circuit is interrupted by a failure of a current-carrying wire (phase or neutral) or a blown fuse or circuit breaker. In three-phase systems, a fault may involve one or more phases and ground, or may occur only between phases. In a non-limiting embodiment, residual element 116 may include an electrical fault, transient fault, persistent fault, asymmetric fault, symmetric fault, bolted fault, arcing fault, and the like thereof. Persons skilled in the art, upon reviewing the entirety of this disclosure, will be aware of the various embodiments of faults that may be detected for purposes as described herein.

With continued reference to FIG. 1, residual element 116 may include a residual current. A "residual current," for the purpose of this disclosure, an electric current that continues to flow in an electrical device when there is no voltage supply. In a non-limiting embodiment, the residual current may include a leakage current. A "leakage current," for the purpose of this disclosure, a current which flows through protective ground conductor to ground. In the absence of grounding or improper grounding connections, it is the current that could flow from any conductive part or the surface of non-conductive parts to ground if any conductive path was available (i.e. human body). In a non-limiting embodiment, the leakage current may include an AC leakage current and/or a DC leakage current. In a non-limiting embodiment, sensor 104 may capture an instance of an AC leakage current in the event a parallel combination of capacitance and DC resistance between a Voltage source (ac line) and the grounded conductive parts of an electrical device, such as, but not limited to, charging component 132, electric aircraft 152, battery pack 160, and/or battery storage unit 176, is detected. In another non-limiting embodiment, sensor 104 may detect a DC leakage caused by the DC resistance usually is insignificant compared to the ac impedance of various parallel capacitances. The capacitance may be intentional (such as in EMI filter capacitors) or unintentional. Some examples of unintentional capacitances are spacings on printed wiring boards, insulations between semiconductors and grounded heat sinks, and the primary-to-secondary capacitance of isolating transformers within the power supply. In a non-limiting embodiment, the residual current may include a fault current. A "fault current," for the purpose of this disclosure, is a current flowing to earth due to an insulation fault. An "insulation fault," for the purpose of this disclosure, is a fault within the insulation materials used in an electrical device such as charging component 132, electric aircraft 152, battery pack 160, battery storage unit 176, etc. In a non-limiting embodiment, the fault current may arise due to defective insulation between live conductors and flows back to ground. Even if a person directly touches a live conductor, the fault current flows to ground. An upstream RCD detects this fault current and immediately disconnects the circuit. In another non-limiting embodiment, the fault current may include an unintended, uncontrolled, high current flow through any electrical system. For example and without limitation, fault currents are caused by very low impedance short circuits. These may be shorts to ground or across phases. The resulting high current flow can result in overheating of equipment and conductors, excesses forces, and at times even serious arcs, blasts, and explosions. Persons skilled in the art, upon reviewing the entirety of this disclosure, will be aware of the various embodiments of a residual current and the causes for purposes as described herein.

Still referring to FIG. 1, residual element 116 may include, a short circuit, an electric overcharge, an electric undercharge, and the like thereof. In another non-limiting example, residual element 116 may include an unsafe amount of water and/or level of wetness on any surface or electrical part of charging component 132 and/or electric aircraft port 156. Computing device 112 may analyze residual datum 108 and isolate residual element 116 which may represent a potential fault and/or hazard to a charging process. In a non-limiting embodiment, residual element 116 may not be any serious fault within the electric components of charging component 132 and/or electric aircraft 152. For example and without limitation, computing device 112 may isolate a relatively high impedance compared to normal operating levels of system 100, which may be well understood by a person of ordinary skill in the art, but may not result in any significant damage. In a non-limiting embodiment, computing device 112 may isolate residual element 116 using thermal overload relay 148, in which the thermal overload may be either too high or low, indicating an unusual thermal event. Persons skilled in the art, upon reviewing the entirety of this disclosure, will be aware of the various potential electrical and thermal phenomenon which may be analyzed for purposes as described herein.

Still referring to FIG. 1, computing device 112 may be configured to determine alert datum 124 as a function of the identification of residual element 116. For purposes of this disclosure, an "alert datum" is an element of information regarding a determination of a residual current, present-time failure, fault, or degradation of a condition or working order of any component and/or connection associated with the charging process, charging component 132, and/or electric aircraft 152. In one or more embodiments, alert datum 124 may be determined as a function of residual datum 108, as discussed further in this disclosure. In some embodiment, computing device 112 may be configured to disable any charging connection based on alert datum 124. In a non-limiting embodiment, alert datum 124 may denote any disconnection between charging component 132 and electric aircraft 152. For example and without limitation, the disconnection may include any electrical disconnection and/or mechanical disconnection. In a non-limiting embodiment, alert datum 124 may include the presence of one or more unsecure connection, wherein the unsecure connection may include a loose and/or faulty connection. For example and without limitation, the connection may include a coupling of a charging port attached to electric aircraft 152 such as electric aircraft port 156 and charging component 132. For example and without limitation, an inappropriately disabled connection may include turning off the charging system and/or charging component 132 when not supposed to, such as in the middle of a charging process. Persons skilled in the art, upon reviewing the entirety of this disclosure, will be aware of the various embodiments of a disconnection for purposes as described herein.

With continued reference to FIG. 1, computing device 112 may be configured to generate a residual prediction datum as a function of the identification of residual element 116. A "residual prediction datum," for the purpose of this disclosure, is one or more elements of data generated by the computing device 112 that represents an expected residual output or range of residual outputs associated with residual element 116. The residual prediction datum may constantly be generated by computing device 112 adjusting for any variations detected in a charging process for electric aircraft 152. In a non-limiting embodiment, computing device 112 may be configured to compare residual element 116 and the residual prediction datum for generating alert datum 124. Computing device 112 may be configured to compare residual element 116 and the residual prediction datum utilizing subtraction. In non-limiting embodiments, subtraction may include subtracting residual element 116 from the residual prediction datum. In non-limiting embodiments, subtraction may include subtracting the residual prediction datum from residual element 116. Computing device 112 may be configured to compare residual element 116 and the residual prediction datum utilizing ratios. In non-limiting embodiments, ratios may include the ratio of residual datum 116 to the residual prediction datum. In non-limiting embodiments, ratios may include the ration of the residual prediction datum to residual datum 116. Computing device 112 may be configured to compare residual datum 116 and the residual prediction datum utilizing addition. In non-limiting embodiments, addition may include adding residual datum 116 and the residual prediction datum and comparing the total to a predetermined threshold datum. The comparison may take place at one point in a flight envelope, constantly with adjusted detected readings and predictions, at regular intervals, when commanded to do so by a pilot, user, or computer, or a combination thereof. In a non-limiting embodiment, computing device 112 may generate alert datum 124 as a function of the comparison. In a non-limiting embodiment, computing device 112 may be configured to compare residual datum 116 and the residual prediction datum at regular intervals such as every second, every minute, every five minutes, or at a predetermined time interval as a function of timer module 172.

With continued reference to FIG. 1, alert datum 124 may include any notification such as previous detections of residual datum, comparisons between the most recent detection with previous detections, textual output, audio output, and any other output configured to warn a user or relay information to a user. In a non-limiting embodiment, alert datum 124 may include a warning, wherein the warning is configured to inform one or more users of residual element 116. A "warning," for the purpose of this disclosure, is any sign indicating an instance of a residual current to be resolved. For example and without limitation, the warning may include an auditory siren incorporated with an automated message informing users of the identification of residual element 116. The warning may include any warning as to be well understood by persons skilled in the art, upon reviewing the entirety of this disclosure. In a non-limiting embodiment, alert datum 124 may be generated as a function of residual threshold 164

Still referring to FIG. 1, computing device 112 may be configured to determine alert datum 124 as a function of residual threshold 164. A "residual threshold," for the purpose of this disclosure, is a set of values that determine if a residual element 116 is above, below, or within a range denoting a significant disruptive phenomenon such as alert datum 124. In a non-limiting embodiment, residual threshold 164 may be used to verify if an identified residual element 116 is a real instance of a leakage. For example and without limitation, sensor 104 may detect a temperature of battery pack 160 wherein the values of residual threshold 164 may include to be between 15 and 35 degrees Celsius, wherein the 15 degrees Celsius and the 35 degrees Celsius values represent the cutoff for the temperature to fall outside of to denote alert datum 124. For example and without limitation, the charging process may include a long process in which a moment and/or instance captured wherein the temperature triggers computing device 112 to identify residual element 116 representing the temperature is not a fluke. A "fluke," for the purpose of this disclosure, is a residual element 116 wherein an element of data indicates an outlier falling outside the residual threshold 164. In another non-limiting embodiment, residual threshold 164 may include lower and upper limits such as 5 mA and 500 mA, respectively. In the event residual element 116 including a leakage current falls between the upper and lower limits, computing device 112 may not generate alert datum 124 and/or execute security measure 120. In an embodiment, computing device 112 may continuously measure if residual element 116 stays inside the lower and upper limits to verify that the instance of residual element 116 is not indicative of a serious threat. Residual leakage currents are commonly present in electrical devices, but they are not always dangerous so computing device 112 may be configured to monitor such parameters to deduce whether or not the instance of a leakage is a fluke or a real threat Persons skilled in the art, upon reviewing the entirety of this disclosure, will be aware of the various embodiments and signs of residual currents and possible outcomes for purposes as described herein.

With continued reference to FIG. 1, in a non-limiting embodiment, computing device 112 may be configured to analyze residual element 116 using timer module 172 in order to determine if residual element 116 is an alert datum 124. With continued reference to FIG. 1, a "timer module,"

for the purpose of this disclosure, is a timing device, is a timing device configured to track the time taken of an occurrence or countdown in the event of an occurrence. In a non-limiting embodiment, timer module 172 may include a watchdog timer. In a non-limiting embodiment, timer module 172 may include an oscillator such as a crystal oscillator or cesium oscillator, wherein the oscillator may be configured to generate and/or use a clock signal. Timer module 172 may include a counter, wherein the counter is configured to count the number of instances of, but not limited to, rising edges, falling edges, and/or changes of a clock signal, and the like thereof. In a non-limiting example, alert datum 124 may include an inappropriate connection between charging component 132 and electric aircraft port 156, in which sensor 104 detects the improper connection. The connection may be established as a function of a human operator or automated operator. In a non-limiting embodiment, alert datum 124 may include a minor improper connection wherein no potential risk of damage to any component is present, wherein computing device 112 may generate security measure 120 using timer module 172, wherein timer module may start a timer of 30 seconds until security measure 120 is initiated. The 30 seconds is provided in order to give an operator ample time to fix the improper connection. In the event alert datum 124 is not resolved by the time the timer of timer module 172 expires, computing device 112 may initiate security measure 120, which may include residual priority command 128. An "residual priority command," for the purpose of this disclosure, is an immediate shutting down of charging related electrical components. In a non-limiting embodiment, residual priority command 128 may include the activation of a siren or alert to indicate a priority situation to be resolved. In a non-limiting embodiment, residual priority command 128 may include electrically disabling all components of charging component 132. For example and without limitation, computing device 112 may immediately shut down all charging processes in the event residual priority command 128 is initiated. Persons skilled in the art, upon reviewing the entirety of this disclosure, will be aware of the various severity of emergencies and protocols designed to respond to them for purposes as described herein.

With continued reference to FIG. 1, generating alert datum 124 may include cutting the power transmitted to battery pack 160 based on receiving residual datum 108 and/or residual element 116. If a battery module of battery pack 160 is electrically connected to a neighboring battery module, controller may cut or divert the electrical connection between the neighboring battery module and the battery module to prevent damage to the neighboring battery module.

With continued reference to FIG. 1, computing device 112 may train a first machine-learning model as a function of a fault detection training set, wherein the first machine-learning model may be configured to output alert datum 124 using residual element 116 as an input. The training set may correlate any past instances of residual element 116 detected from previous instances in which alert datum 124 have been determined and security measure 120 has been generated/initiated. In a non-limiting embodiment, computing device 112 may identify residual element 116 and determine the correct alert datum based on the training set that best correlates the inputted residual element 116 to an alert datum retrieved from the database. The training set may be used as an input for a machine-learning algorithm which may be used by the machine-learning model to output alert datum 124, which is a determination that residual element 116 is an alert datum 124. In a non-limiting embodiment, computing device 112 may train a second machine-learning model using a disruption training set, wherein the second machine-learning model is configured to output security measure 120 using alert datum 124 as an input. In a non-limiting embodiment, computing device 112 may determine alert datum 124 and generate and/or associate the correct security measure based on the residual training set that best correlates the inputted alert datum 124 to a security measure 120 retrieved from the database. The residual training set may be used as an input for a second machine-learning algorithm which may be used by the machine-learning model to output security measure 120. Persons skilled in the art, upon reviewing the entirety of this disclosure, will be aware of the various embodiments of machine-learning for purposes as described herein.

With continued reference to FIG. 1, computing device may be configured to generate security measure 120 as a function of alert datum 124. In a non-limiting embodiment, computing device may be configured to execute security measure 120 as a function of alert datum 124 and/or timer module 172. In one or more embodiments, alert datum 124 may indicate battery pack 160 of electric aircraft 152 and/or battery storage unit 176 of charging component 132, is operating outside of an acceptable operation condition represented by a threshold such as fault threshold 164. In a non-limiting embodiment, fault threshold 164 may be used to initiate a specific reaction of computing device 112 such as security measure 120. The threshold may be set by, for example, a user or computing device 112 based on, for example, prior use or an input. For example, and without limitation, computing device 112 may indicate that battery pack 160 of electric aircraft 152 and/or battery storage unit 176 of charging component 132 has a current of 350 mA. Such a current may be outside of a preconfigured threshold of an upper limit of, for example, 300 mA of an operational condition, such as current, of a battery pack 160 and/or battery storage unit 176 and thus the charging connection may be disabled by computing device 112 to prevent overcharging and any further leakage to battery pack 160 of electric aircraft 152 and/or battery storage unit 176. For the purposes of this disclosure, a "security measure" is a signal transmitted and/or to be initiated to electric aircraft 152 and/or charging component 132 in a response to alert datum 124, wherein the response is an electrical turnoff of any electric switch of any electrical components involved in the charging process. In a non-limiting embodiment, security measure 120 may include a plurality of security measures 120. For example and without limitation, computing device 112 may generate the plurality of security measures based on the level of severity of residual element 116 and/or as a function of residual threshold 164. In a non-limiting embodiment, security measure 120 may include a protocol in which computing device 112 is configured to provide instructions and/or a command to disable and/or terminate any switch and/or charging connection between electric aircraft 152 and/or electric aircraft port 156 and charging component 132. "Executing," for the purpose of this disclosure, is transmitting a signal to triggering the process of security measure 120, including one or more instructions for the completion and/or execution of the process. In a non-limiting embodiment, security measure 120 may eliminate one or more connections from charging component 132 to any port. For example, and without limitation, security measure 120 may eliminate one or more secure connections, unsecure connections, loose connections, faulty connections, and the like thereof by any means of disconnection. In a non-limiting embodiment, computing device 112 may initiate, execute, and/or perform security measure 120 automatically. In a non-limiting example, security measure 120 may include one or more physical disconnections such as removing one or more charging connectors and/or plugs from any port. In another non-limiting example, security measure 120 may include one or more electrical disconnections such as eliminating one or more circuits and/or current feeds from the charging connector, electric aircraft port 156, charging component 132, and/or electric aircraft 152. Security measure 120 may include disabling any electrical connection associated with charging, wherein disabling may include disabling the charging connection, terminating a communication between electric aircraft 152 and charging component 132. For example, and without limitation, disabling the charging connection may include terminating a power supply to charging component 132 so that charging component 132 is no longer providing power to electrical aircraft 152. In another example, and without limitation, disabling the charging connection may include terminating a power supply to electric aircraft 152. In another example, and without limitation, disabling the charging connection may include using a relay or switch between charging component 132 and electric aircraft 152 to terminate charging connection and the charging of between charging component 132 and electric aircraft 152.

With continued reference to FIG. 1, security measure 120 may include a set of instructions that an operator or a plurality of operators may undertake to resolve residual element 116. For example and without limitation, security measure 120 may include disconnecting all ports associated with charging between electric aircraft 152 and charging component 132, by means of physical human maneuvers. In the event such measures are not undertaken or not undertaken within a specific time limit set by timer module 172, residual priority command 128 may be initiated, wherein any charging connectors are blocked by any locking mechanism within charging component 132. In a non-limiting embodiment, the locking mechanism may be controlled as a function of a safety lock instruction which may be a part of security measure 120. A "safety lock instruction," for the purpose of this disclosure, is a safety feature and an operational direction or implementation for charging component 132 and any locking mechanism it may have. In a non-limiting embodiment, the safety lock instruction may include a feature that may control, whether or not charging (or current flow) should be enabled, disabled, modified, regulated, or the like. For example and without limitation, the safety lock instruction include an initial security measure to verify a physical connection between charging component 132 and electric aircraft 152 and/or electric aircraft port 156 is established. In another non-limiting example, the safety lock instruction may include a feature that ensures no current flow is occurring between charging component 132 and electric aircraft 152 or electric aircraft port 156. The safety lock instruction may include specific instructions that may instruct any locking mechanism within charging component 132 to block any transfer of electrical energy between charging component 132 and electric aircraft 152. For example and without limitation, the safety lock instruction may include instructions for computing device 112 and/or charging component 132, which may be electrically connected with computing device 112, to lock fastener 144 to ensure no flow of electrical energy is occurring as long as charging component 132 is not mated with electric aircraft 152 and/or electric aircraft port 156. In a non-limiting embodiment, computing device 112 and/or charging component 132 may unlock fastener 144 to ensures that there is a flow of electrical energy between charging component 132 and electric aircraft port 156. In a non-limiting embodiment, the safety lock instruction may include a feature that ensure fastener 144 fastener is locked indefinitely without interruption, until the performance of the charging instruction is complete. In another non-limiting example, the safety lock instruction may include unlocking fastener 144 in order to disconnect any charging connectors and/or cables from charging component 132 and/or electric aircraft port 156. Persons skilled in the art, upon reviewing the entirety of this disclosure, will be aware of the various safety features for controlling a fastener for purposes as described herein.

With continued reference to FIG. 1, a charging connection may be interrupted abruptly by an outside factor such as a user or an accident, wherein computing device 112 may initiate a residual priority command 128. A "residual priority command," for the purpose of this disclosure, is any security measure that may denote a specific response to a high priority residual element 116. For example and without limitation, charging component 132 may experience a fire hazard in which such a hazard may result in an imminent danger, wherein residual priority command 128 may be initiated. Residual priority command 128 may include an immediate shutdown and/or breaking down of all electrical circuits powering any electrical components of system 100 and/or involved in the charging process. Compared to a minor residual element 116, such a shutdown and/or breakdown may be executed after a delay in time as a function of timer module 172, wherein the delay of time may provide ample time to resolve residual element 116 automatically and/or manually. This may include executing a safety lock instruction on charging component 132. For example and without limitation, charging component 132 may detach itself from electric aircraft port 156 by any method of ejections on any charging connector and/or cable. In a non-limiting embodiment, charging component 132 may include clips or springs used to hold onto a charging connector securely onto electric aircraft port 156 using clips or eject the charging connector immediately using springs, which may be unlocked by fastener 144. Persons skilled in the art, upon reviewing the entirety of this disclosure, will be aware of the various embodiments of detaching for purposes as described herein.

With continued reference to FIG. 1, computing device 112 may be configured to trip charging component 132 as a function of security measure 120. In a non-limiting embodiment, computing device 112 may operate any switch including, but not limited to, thermal overload relay 148. In a non-limiting embodiment, computing device 112 may be configured to perform redundancy switching as a function of thermal overload relay 148, which may part of security measure 120. "Redundancy switching," for the purpose of this disclosure, is a process of switching a primary equipment to at least a secondary equipment in response to a fault, wherein the redundancy switching is configured to protect any electrical equipment on the side of charging component 132. In a non-limiting embodiment, security measure 120 instruct computing device 112 to operate switch connecting battery storage unit 176 to charging component 132 in charging an electric vehicle to a secondary battery storage unit, wherein the secondary battery storage unit is a backup storage unit configured to maintain and power the operation of system 100 in the event battery storage unit 176 is compromised due to residual element 116. For example and without limitation, residual element 116 may include an instance when battery storage unit 176 is lacking sufficient power that is used to power not only the components of system 100, but also electric aircraft 152, in which computing device 112 may initiate security measure 120 by operating a switch to switch from using the main battery storage unit 176 to the secondary storage unit. Persons skilled in the art, upon reviewing the entirety of this disclosure, will be aware of the various purposes for redundancy switching as described herein.

With continued reference to FIG. 1, computing device 112 may be configured to assign residual element 116 with a trip class. A "trip class," for the purpose of this disclosure, is a thermal current rating. For example and without limitation, a thermal class 5 is usually used for motors requiring fast tripping. A thermal class 10 is commonly used to protect artificially cooled motors such as submersible pump motors of low thermal capacity. A thermal class 20 is usually sufficient for general purpose applications. Each class denotes an amount of time delayed for a switch such as thermal overload relay 148 to trip. For example and without limitation, Class 10 will trip in 10 seconds or less, Class 20 will trip in 20 seconds or less, and Class 30 will trip in 30 seconds or less. In a non-limiting embodiment, security measure 120 may include instructing thermal overload relay 148, as a function of computing device 112, to trip charging component 132 and/or electric aircraft 152 based on a trip class. For example and without limitation, a minor residual element 116, such as a loose connection of charging component 132, an inappropriate disconnection of charging component 132, and the like thereof, may be assigned a trip class of 30. Residual element 116 of a more severe matter which may trigger a residual priority command such as a high voltage residual current, high voltage leakage current, an extreme electric overcharge, and the like thereof, may be assigned a trip class of 5 or less, indicating a more faster tripping process. Persons skilled in the art, upon reviewing the entirety of this disclosure, will be aware of the various shutdown procedures for various incidents with various levels of priority and severity for purposes as described herein.

With continued reference to FIG. 1, security measure 120 may include operating a residual current device (RCD) incorporated with charging component 132. A "residual current device," for the purpose of this disclosure, is a safety device configured to break any electrical circuit to protect an electrical system and its equipment of a risk of serious harm from an ongoing electric shock. In a non-limiting embodiment, computing device 112 may be configured to quantify residual element 116 and then identify the source, wherein the source may include a faulty wiring, faulty battery module, faulty power source, and the like thereof. In a non-limiting embodiment, computing device 112 may act as a voltage supervisor. Computing device 112 may monitor for alternating currents and potential residual currents using any timer module such as a watchdog timer configured to help ensure that the computing device 112 does not latch by periodically detecting pulses sent by the computing device 112 general-purpose input/output pin. If the software glitches and a pulse is missed, the watchdog timer will reset the computing device 112. Computing device 112 may incorporate any RCD, for example and without limitation, the RCD may include an Earth Leakage Relay (ELR). The Earth Leakage Relay with Core Balanced Current transformer provides protection from earth leakage with advance intimation (Pre-alarm) of impending occurrence of the event. As a part of security measure 120, a user can proactively take action to avoid occurrence of any mishaps. For example and without limitation, security measure 120 may have instructions to use a Rishabh's ELR with 4 digit 7 segment LED display with True RMS measurement (as per IEC 60947-2 Annex M) that provides the user with the equipment to measure low level of leakage current and isolate the faulty equipment or circuit from the system. Leakage current is sensed through Rishabh's Core Balanced Current Transformer. Fixed time trip occurs when Earth Leakage Current exceeds the trip time which is programmable by means of front keys provide on the front panel of the relay or PRKAB software (can be provided optionally with Rishabh's ELR). The user can then program residual threshold level 164 ranging from 30 mA to 30 A. In case of earth leakage the LED indicators will glow depending upon the percentage of programmed threshold value. For e.g. If the set level is 30 mA and the leakage current is more than 15 mA then green LED will start blinking which will provide a visual alert to the user. This empowers the user to take corrective actions before any accident. Core Balanced Current Transformer (CBCT) uses the technology of residual magnetic flux. All conductors to be protected shall pass through the core balance current transformer. The vector sum of all the currents should be equal to zero. Persons skilled in the art, upon reviewing the entirety of this disclosure, will be aware of the various embodiments and function of any residual current device as described herein.

With continued reference to FIG. 1, computing device 112 may be configured to operate 1-phase and 3-phase inverters as a part of security measure 120. For example and without limitation, the leakage currents in frequency inverters arise through internal interference-suppression measures and all parasitic capacitances in the inverter and motor cables. The largest leakage currents, though, are caused by the method of operation of the inverter. In a non-limiting embodiment, the inverters control motor speed continuously using pulse-width modulation (PWM), which generates leakage currents far above the grid frequency of 50 Hz. For instance, the switching frequency of an inverter might be 4 kHz, and the associated harmonics can have very large amplitudes at higher frequencies. These frequencies then travel over the motor cables to the motor, and so the motor cables with their grounded shields act like a capacitor to ground. Current is then diverted to earth through this capacitance. It is thus recommended to separate filtered and unfiltered cables, otherwise high-frequency interference signals can be carried over the filtered cable. Persons skilled in the art, upon reviewing the entirety of this disclosure, will be aware of the various embodiments and functions of frequency inverters in response to residual current for purposes as described herein.

With continued reference to FIG. 1, computing device 112 may be configured to operate a first mode. A "first mode," for the purpose of this disclosure, is a computing device configured to execute security measure 120 on electric aircraft 152. In a non-limiting embodiment, alert datum 120 denote residual element 116 identified on the side of electric aircraft 152. This may be detected through the connection established by charging component 132. For example and without limitation, the first mode may be exclusively responsible for managing and/or monitoring a security measure curated for reducing potential harm by a residual current within electric aircraft 152. In a non-limiting embodiment, the first mode is further configured may terminate one or more connections of a battery component, such as a battery module, to its neighboring battery components, as a function of the identification of residual element 116. In another non-limiting embodiment, computing device 112 may be configured to operate a second mode. A "second mode," for the purpose of this disclosure, is a computing device configured to execute security measure 120 on charging component 132. In a non-limiting embodiment, alert datum 120 may denote residual element 116 identified on the side of charging component 132 such as its battery storage unit 176. For example and without limitation, the second mode may trip charging component 132 in the event residual element 116 is identified within the charging component and execute a specific security measure 120 based on the trip class associated with residual element 116. Persons skilled in the art, upon reviewing the entirety of this disclosure, will be aware of various embodiments of the first mode and second mode for various management purposes as described herein.

Figure 2A:
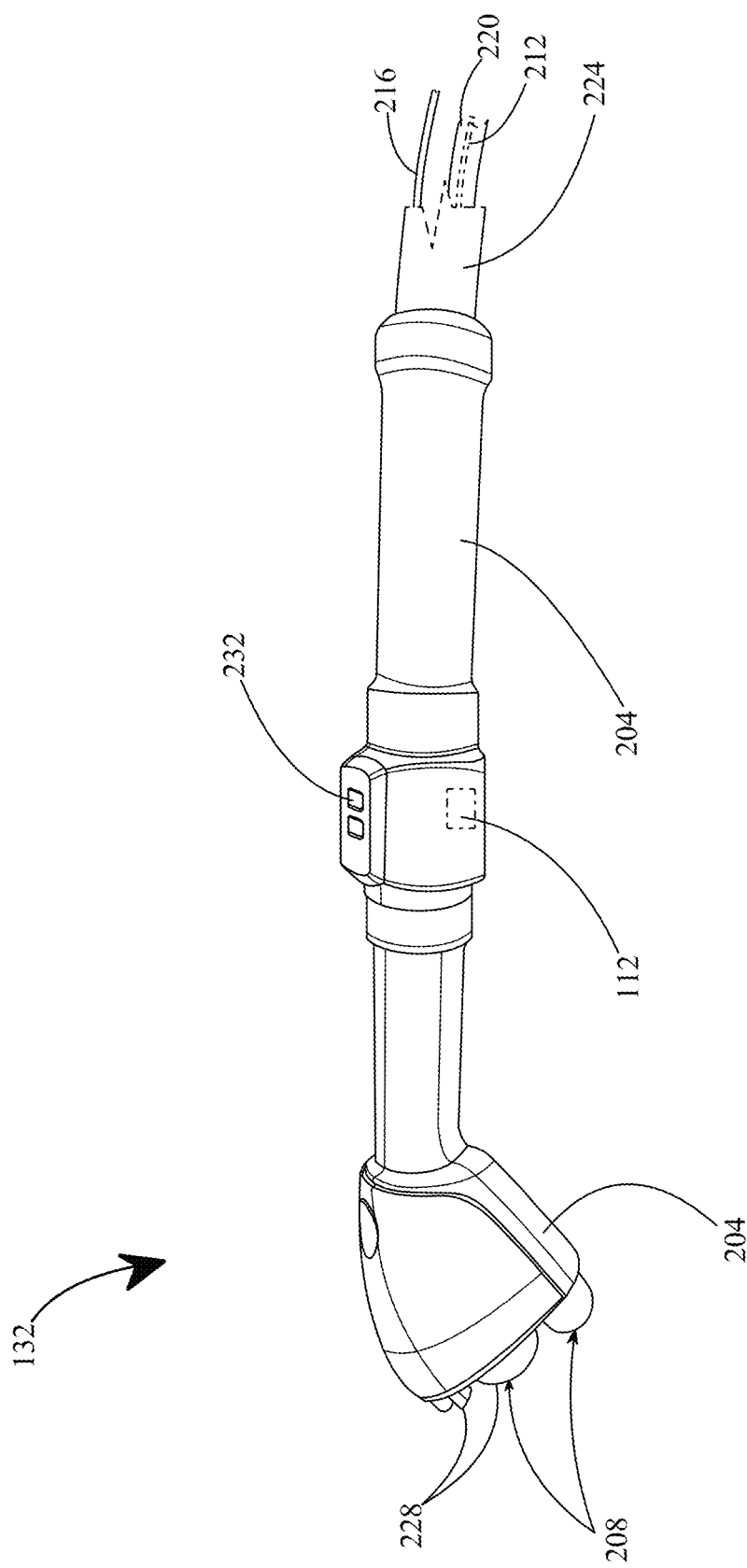
FIGS. 2A and 2B are exemplary schematics of an exemplary embodiment of a charging component in accordance with one or more embodiments of the present disclosure.
Figure 2B:
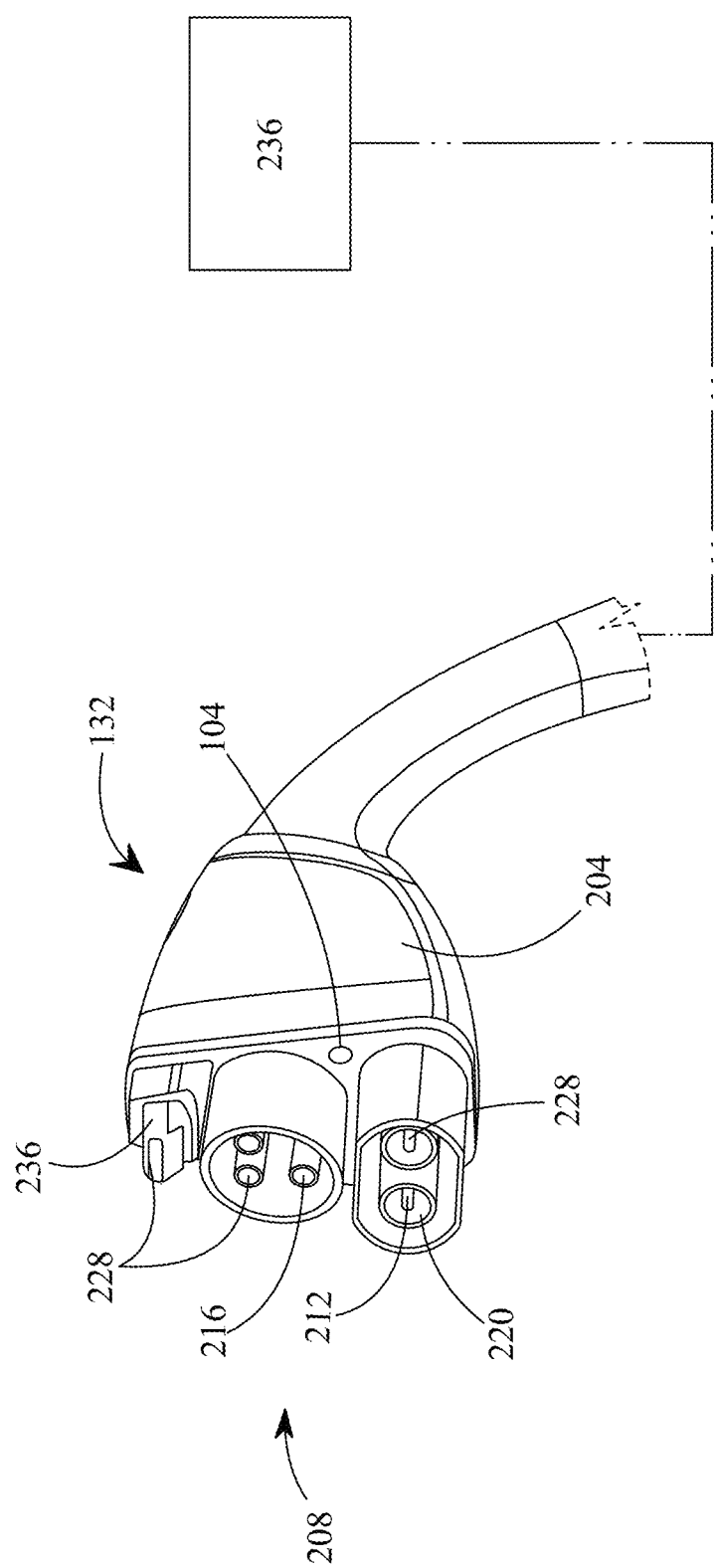

Referring now to the drawings wherein the showings are for purposes of illustrating embodiments of the present disclosure only, and not for purposes of limiting the same, FIGS. 2A and 2B illustrate an exemplary embodiment of a charging component 132. As shown in FIG. 2A, charging component 132 (also referred to herein as a "connector") facilitates transfer of electrical power between a power source of a recharging station and an electric aircraft, such as a power source of the electric aircraft and/or electrical systems of the electric aircraft. Power source of a recharging station may be a battery storage unit 176, as shown in FIG. 1. Electric aircraft may be aircraft 152 or aircraft 800. As used in this disclosure, "charging" refers to a process of increasing energy stored within a power source. In some cases, and without limitation, a power source may include a battery and charging may include providing electrical power, such as an electrical current, to the battery. In another embodiment, charging component 132 may be used to power auxiliary components onboard an aircraft. As used herein, "powering" is the act of supplying a component with energy.

In one or more embodiments, and still referring to FIG. 2A, charging component 132 may include a distal end of a flexible tether 224 or a bundle of tethers, e.g., hose, tubing, cables, wires, and the like, attached to a charging unit, such as a charging station or charger. Charging component 132 may be configured to connect charging unit to an electric aircraft to create an electrical communication between charging unit and electric aircraft, as discussed above. Charging component 132 may be configured to removably attach to a port 156 of electric aircraft (shown in FIG. 1), such as aircraft 152, using, for example, a mating component 228. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 2A, charging component 132 may include a housing 204, which is described in further detail in FIG. 1. Housing 204 and/or charging component 132 may be configured to mate with a port of an electric aircraft, such as aircraft 152, using a mating component 228. As used in this disclosure, a "mating component" is a device or mechanism that allows an action of attaching two or more components together. Mating component 228 may include a mechanical or electromechanical mechanism described in this disclosure. For example, without limitation mating may include an electromechanical device used to join electrical conductors and create an electrical circuit. In some cases, mating component 228 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of charging component 132. In some cases, mate may be lockable. In one or more embodiments, housing 204 may include controls 232. Controls 232 may be actuated by a user to initiate, terminate, and/or modify parameters charging. For example, and without limitation, a button of controls 232 may be depressed by a user to initiate a transfer of electrical power from charging unit to electric aircraft. Controls 232 may include buttons, switches, slides, a touchscreen, joystick, and the like. In some embodiments, controls 232 may include a screen that displays information related to the charging of a power source. In an embodiment, screen may be communicatively connected to a recharge controller in an aircraft, such as a recharge controller in aircraft 152, discussed above. Recharge controller may monitor battery parameters in aircraft 152 and transmit data to a screen on charging component 132 relating to the battery/power source of the aircraft. For example, and without limitation, screen may display an amperage or voltage of electrical power being transferred to power source of electric aircraft. Screen may also display a calculated amount of time until power source is charged to a desired amount (e.g., desired state of charge). Screen may also display data detected by components, such as a sensor and/or recharge controller, of connector and/or electric aircraft. For example, and without limitation, screen may display a temperature of an energy source of electric aircraft. In an exemplary embodiment, a user may actuate, for example, a switch, of control 232 to initiate a cooling of a component of charging component 132 and/or electric aircraft in response to displayed information and/or data on screen of charging component 132. Initiating of a cooling of one or more embodiments of charging component 132 may include a coolant source displacing a coolant within a cooling channel, as discussed further in this disclosure below. Additionally or alternatively, actuating a switch of control 232 may initiate charging of an electric aircraft. Charging may include primary charging and/or auxiliary charging, discussed below. Controlling a transmission of electrical power and/or charging of an electric aircraft using a connector may be consistent with charging described in U.S. Nonprovisional application Ser. No. 17/405,840, filed on Aug. 18, 2021, and entitled "CONNECTOR AND METHODS OF USE FOR CHARGING AN ELECTRIC VEHICLE", U.S. Nonprovisional application Ser. No. 17/407,358, filed on Aug. 20, 2021, and entitled "CONNECTOR AND METHOD FOR USE FOR AUTHORIZING BATTERY CHARGING FOR AN ELECTRIC VEHICLE", U.S. Nonprovisional application Ser. No. 17/515,508, filed on Oct. 31, 2021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 2A, mating component 228 of housing 204 may include a fastener, such as fastener 144 as discussed and shown in FIG. 1. Charging component 132 may also include a computing device, such as computing device 112.

With continued reference to FIG. 2A, charging component 132 may include one or more charging cables that each include a conductor 208, which has a distal end approximately located within charging component 132 and a proximal end approximately located at an energy source of charging unit. In some cases, conductor 208 may be configured to charge and/or recharge electric aircraft. For instance, conductor 208 may be connected to an energy source of a charging unit and conductor may be designed and/or configured to facilitate a specified amount of electrical power, current, or current type. For example, conductor 208 may include a direct current conductor. In some cases, conductor 208 may include an alternating current conductor. Conductor 208 may be consistent with any conductor as discussed herein.

In one or more embodiments, and still referring to FIG. 2A, conductor 208 may include a primary conductor 212. In an embodiment, primary conductor 212 may be a high-voltage conductor. In a non-limiting embodiment, a high-voltage conductor may be configured for a potential no less than 100 V. In some embodiments, primary conductor 212 may include a direct current (DC) conductor. Primary conductor 212 may include a DC conductor pin, which extends from housing 204 and allows for the flow of DC power into and out of the electric aircraft via port. In other embodiments, primary conductor 212 may include an alternating current (AC) conductor. An AC conductor may include any component responsible for the flow of AC power into and out of the electric aircraft. The AC conductor may include a pin that extends from housing 204 that may allow for a transfer of electrical power between connector and power source of electrical aircraft. In some embodiments, a pin of primary conductor 212 may include a live pin, such that the pin is the supply of DC or AC power. In other embodiments, pin of primary conductor 212 may include a neutral pin, such that the pin is the return path for DC or AC power.

With continued reference to FIG. 2A, conductor 208 may include an auxiliary conductor 216. In a non-limiting embodiment, auxiliary conductor 216 may be configured for a potential no greater than 100 V. For example, auxiliary conductor 216 may be configured for a potential of 24V. Auxiliary conductor 216 may be configured for AC or DC current. In one or more embodiments, auxiliary conductor 216 may be used as an auxiliary connector to power auxiliary equipment of electric aircraft. Auxiliary components/equipment may be consistent with any auxiliary components discussed herein, such as with reference to FIG. 1. Exemplary embodiments of auxiliary components may include air conditioning, heating, heating element in aircraft seats, deicing equipment, and the like. Heating element in aircraft seats may include an electrical resistance heating element. Auxiliary components may include components that are not needed for short flights. In some embodiments, auxiliary components may only be powered using auxiliary conductor 216 such that auxiliary components are not powered after charging component 132 is removed, thus, auxiliary components may be off during in-flight activities.

With continued reference to FIG. 2A, in another embodiment, auxiliary conductor 216 may provide secondary function. For example, auxiliary conductor 216 may provide communication, proximity signals, and the like. Communication conductors and proximity signal conductors are discussed below. Auxiliary conductor 216 may be a communication conductor, proximity signal conductor, and the like.

With continued reference to FIG. 2A, primary conductor 212 and auxiliary conductor 216 may receive an electrical current from a power source (also referred to as "energy source") of charging component 132. In some cases, power source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 2A, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric vehicle. In some embodiments, charging battery may include a constant voltage charger, a constant current charger, a taper current charger, a pulsed current charger, a negative pulse charger, an IUI charger, a trickle charger, and a float charger.

In one or more embodiments, and still referring to FIG. 2A, conductor 208 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 208 may be covered by insulation except for at conductor pin, which may contact a component or interface of port of electric aircraft as part of mating component 228. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Now referring to FIG. 2B, in some embodiments, a charging component 132 may additionally include an alternating current to direct current converter configured to convert an electrical charging current from an alternating current. Power converters are discussed in further detail in FIG. 1.

With continued reference to FIG. 2B, a conductor 208 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric vehicle (e.g., within an electric vehicle battery) and/or located within charging component 132. For example, in some cases, control signal may be associated with a battery within an electric vehicle. For example, control signal may include a battery sensor signal. As used in this disclosure, a "battery sensor signal" is a signal representative of a characteristic of a battery. In some cases, battery sensor signal may be representative of a characteristic of an electric vehicle battery, for example as electric vehicle battery is being recharged. In some versions, computing device 112 may additionally include a sensor interface configured to receive a battery sensor signal. Sensor interface may include one or more ports, an analog to digital converter, and the like. Computing device 112 may be further configured to control one or more of electrical charging current and coolant flow as a function of sensor signal from a sensor 104 and/or control signal. For example, computing device 112 may control a coolant source 236 and/or charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric vehicle battery, for example temperature of one or more battery cells within an electric vehicle battery. In some cases, a sensor, a circuit, and/or a computing device 112 may perform one or more signal processing steps on a signal. For instance, sensor, circuit or computing device 112 may analyze, modify, and/or synthesize a signal in order to improve the signal, for instance by improving transmission, storage efficiency, or signal to noise ratio.

With continued reference to FIG. 2B, a conductor 208 may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration.

With continued reference to FIG. 2B, charging component 132 may include a cooling channel 220. Cooling channel 220 may have a distal end located substantially at charging component 132, and cooling channel 220 may have a proximal end located at a coolant source 236, as discussed further below in this disclosure. As used in this disclosure, a "cooling channel" is a component that is substantially impermeable to a coolant and contains and/or directs a coolant flow. As used in this disclosure, "coolant" is any flowable heat transfer medium. Coolant may include a fluid, such as a liquid or a gas. Coolant may include a compressible fluid and/or a non-compressible fluid. Coolant may include compressed air, liquid coolant, gas coolant, and the like. Coolant may include a non-electrically conductive liquid such as a fluorocarbon-based fluid, such as without limitation Fluorinert™ from 3M of Saint Paul, Minnesota, USA. In some cases, coolant may include air. As used in this disclosure, a "flow of coolant" is a stream of coolant. In some cases, coolant may include a fluid and coolant flow is a fluid flow. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. In some cases, cooling channel 220 may be a separate component positioned within housing 204, such as a polymeric tube. In other cases, cooling channel 220 may be an integrated component, such as a molded component disposed within a housing 204 created using a mold form. In other cases, cooling channel 220 may be a combination of both an integrated component and a molded component. In one or more embodiments, cooling channel 220 may include any component responsible for the flow of coolant into and/or out of electric aircraft. Cooling channel 220 may solely cool (e.g., reduce a current temperature) connecter 200 such that the coolant flows through or next to the cables within the connector. For example, and without limitation, cooling channel may reduce the temperature of one or more conductors 208 of charging component 132. Cooling channel 220 may include any component, such as a sensor, responsible for transmitting signals describing a cooling of electric aircraft or charging connector, such as cooling requirements, current temperature, maximum and/or minimum temperature, and the like. Cooling channel 220 may assist in rapid charging of an energy source of electric aircraft such that coolant assistants in cooling down the electrical components to aid in faster charging. Flow of coolant through cooling channel 220 may be initiated by computing device 112. Computing device 112 may initiate and/or terminate a flow of coolant through cooling channels 220 as a function of detected data by sensor 104 of charging component 132 or a sensor of electric aircraft, as discussed further below in this disclosure.

In one or more embodiments, and still referring to FIG. 2B, primary conductor 212 may be disposed within cooling channel 220 (also see FIG. 2A). For instance, and without limitation, primary conductor 212 may be disposed coaxially within cooling channel 220. Thus, primary conductor 212 may traverse along the center of cooling channel 220 so that coolant may surround primary conductor 212 and reduce a temperature of primary conductor 212 during charging of electric aircraft. Similarly, auxiliary conductor 216 may be coaxially disposed within cooling channel 220. Conductors 208 may all be disposed within cooling channel 220, each separated by an insulator, or conductors 208 may each be disposed within a corresponding cooling channel 220, wherein each cooling channel 220 is in fluidic communication with coolant source 236. In other embodiments, cooling channel 220 may abut one or more conductors 208 to cool conductors 208 and/or charging component 132. For example, and without limitations, cooling channel 220 may physically abut at least one of the primary conductor 212 and the auxiliary conductor 216.

In one or more embodiments, and still referring to FIG. 2B, cooling channel 220 may be in fluidic communication with coolant source 236. As used in this disclosure, a "coolant source" is an origin, generator, reservoir, or flow producer of coolant. In some cases, a coolant source 236 may include a flow producer, such as a fan and/or a pump. Coolant source 236 may include any of following non-limiting examples, air conditioner, refrigerator, heat exchanger, pump, fan, expansion valve, and the like. In some embodiments, coolant source 236 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 236 comprises a heart transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, computing device 112 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to computing device 112. Computing device 112 may receive coolant temperature signal and control heat transfer between ambient air and coolant as a function of the coolant temperature signal. Computing device 112 may use any control method and/or algorithm used in this disclosure to control heat transfer, including without limitation proportional control, proportional-integral control, proportional-integral-derivative control, and the like. In some cases, computing device 112 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, coolant source 236 may be further configured to transfer heat between a heat source, such as without limitation ambient air or chemical energy, such as by way of combustion, and coolant, for example coolant flow. In some cases, coolant source 236 may heat coolant, for example above ambient air temperature, and/or cool coolant, for example below an ambient air temperature. In some cases, coolant source 236 may be powered by electricity, such as by way of one or more electric motors. Alternatively or additionally, coolant source 236 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate hear transfer between the coolant flow and at least a conductor of electric vehicle, including without limitation electrical busses within at least a battery.

Still referring to FIG. 2B, in some embodiments, coolant source 236 may occur synchronously and/or asynchronously with charging. For example, in some case, coolant source 236 may be configured to provide a flow of coolant prior to charging a battery of an electric vehicle. In some embodiments, cooling channel 220 may facilitate fluidic and/or thermal communication with coolant source 236 and at least a battery when charging component 132 is connected to port 212. Alternatively and/or additionally, cooling channel 220 may facilitate fluidic and/or thermal communication with coolant source 236 and a cabin and/or cargo-space of aircraft when charging component 132 is connected to port 212. In some cases, cooling channel 220, coolant sources 232, and/or connectors may be used to connect to multiple components of an electric vehicle. In some cases, coolant source 236 may provide conditioned air in order to control an environmental temperature within an electric vehicle, such as an aircraft, for example without limitation for cargo, passengers, and/or crew. In some cases, coolant source 236 may pre-condition at least a vehicle battery. As used in this disclosure, "pre-conditioning" is an act of affecting a characteristic of a battery, for example battery temperature, pressure, humidity, swell, and the like, substantially prior to charging. For example and without limitation, coolant source 236 may be configured to pre-condition at least a battery prior to charging, by providing a coolant flow to the at least a battery and raising and/or lowering temperature of the at least a battery. As a further non-limiting example, pre-conditioning may occur for a predetermined time prior to charging (e.g., 1 min, 10 min, 1 hour, 4 hours, and the like). Alternatively or additionally, pre-conditioning may be feedback controlled, by way of at least a battery sensor, and occur until or for a predetermined time after a certain condition has been met, such as without limitation when at least a battery is within a desired temperature range. In some cases, coolant source 236 may be configured to pre-condition any space or component within a vehicle, such as an aircraft, including without limitation cargo space and cabin. In some cases, and without limitation, coolant source 236 may provide cooling to at least a battery after charging the at least a battery. In some cases, and without limitation, at least a machine-learning process may be used to determine and/or optimize parameters associated with cooling at least a battery. In some non-limiting cases, computing device 112 may use at least a machine-learning process to optimize cooling time relative of current charging metrics, for example charging battery parameters and/or sensor signals. Coolant source 236 may include any computing device described in this disclosure. Coolant source 236 and computing device 112 may utilize any machine-learning process described in this disclosure.

With continued reference to FIG. 2B, computing device 112 may be configured to control one or more electrical charging current within conductor 208 and coolant flow within cooling channel 224. As used in this disclosure, a "controller" is a logic circuit, such as an application-specific integrated circuit (ASIC), FPGA, microcontroller, and/or computing device that is configured to control a subsystem. For example, computing device 112 may be configured to control one or more of coolant source 236 and/or charging battery. In some embodiments controller may control coolant source 236 and/or charging battery according to a control signal. As used in this disclosure, "control signal" is any transmission from controller to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate one or more of coolant source 236 and/or charging battery. For example, in some cases, coolant source 236 may include a valve to control coolant flow and computing device 112 may be configured to control the valve by way of control signal. In some cases, coolant source 236 may include a flow source (e.g., a pump, a fan, or the like) and computing device 112 may be configured to control the flow source by way of control signal. In some cases, coolant source 236 may be configured to control a temperature of coolant and computing device 112 may be configured to control a coolant temperature setpoint or range by way of control signal. In some cases, charging battery may include one or electrical components configured to control flow of an electric recharging current or switches, relays, direct current to direct current (DC-DC) converters, and the like. In some case, charging battery may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charging battery or within communication with charging battery are configured to affect electrical recharging current according to control signal from computing device 112, such that the computing device 112 may control at least a parameter of the electrical charging current. For example, in some cases, computing device 112 may control one or more of current (Amps), potential (Volts), and/or power (Watts) of electrical charging current by way of control signal. In some cases, computing device 112 may be configured to selectively engage electrical charging current, for example ON or OFF by way of control signal.

With continued reference to FIG. 2B, charging component 132 may be configured such that one or more conductors 208 and cooling channel 220 make a connection with mating component 228 of electric vehicle port when the charging component 132 is mated with electric vehicle port.

With continued reference to FIG. 2B, a conductor 208, such as auxiliary conductor 216 (or auxiliary conductor in FIG. 1) may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric vehicle port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between charging component 132 and a port, for example electric vehicle port.

Still referring to FIG. 2B, in some cases, charging component 132 may additionally include a proximity sensor. For example, and without limitation, sensor 104 may include a proximity sensor. Proximity sensor may be electrically communicative with a proximity signal conductor. Proximity sensor may be configured to generate a proximity signal as a function of connection between charging component 132 and a port, for example port of electric aircraft. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

Still referencing FIG. 2B, in some embodiments, sensor 104 may include a clamp meter, as discussed in FIG. 1. Sensor 104 may be configured to detect residual energy in a conductor 208 and/or charging connector 132. This is discussed in further detail in FIG. 1.

Still referring to FIG. 2B, in some embodiments, charging component 132 may additionally include an isolation monitor conductor configured to conduct an isolation monitoring signal. In some cases, power systems for example charging battery or electric aircraft batteries must remain electrically isolated from communication, control, and/or sensor signals. As used in this disclosure, "isolation" is a state where substantially no communication of a certain type is possible between to components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric vehicle, are often by virtue of their function placed in close proximity with a battery. A battery sensor that measures battery charge and communicates a signal associated with battery charge back to computing device 112 is at risk of becoming unisolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or charging battery) may be required for housing of charging component 132 and a ground. Isolation monitoring signal may, in some cases, communication information about isolation between an electrical power and ground, for example along a flow path that includes charging component 132.

Still referring to FIG. 2B, in some embodiments, charging component 132 may additionally include a cooling channel 220 being located proximal or otherwise in thermal communication with one or more conductors 220, for example direct current conductor and/or alternating current conductor. In some cases, heat generated within one or more conductors 208 may be transferred into coolant within cooling channel 220. In some cases, cooling channel 220 may be arranged substantially coaxial with one or more conductors 220, such that coolant flows substantially parallel with an axis of the one or more conductors 220. Alternatively or additionally, in some cases, cooling channel 220 may be arranged in cross flow with one or more conductors 220. In some cases, charging component 132 may include a heat exchanged configured to extract heat from one or more conductors 220, for example at a location of high current and/or high impedance (e.g., resistance) within conductor. In some cases, generated heat within a conductor 208 may be proportional to current within conductor squared. Heating within a conductor 208 may be understood according to Joule heating, also referred to in this disclosure as resistive, resistance, or Ohmic heating. Joule-Lenz law states that power of heat generated by a conductor 208 is proportional to a product of conductor 208 resistance and a square of current within the conductor 208, see below.

$$P \propto I^2 R$$

where P is power of heat generated, for example in Watts, I is electric current within conductor 208, for example in Amps, and R is resistance of conductor 208, for example in Ohms. In some cases, coolant flow may be configured to provide a cooling load that is sufficient to cool at least a conductor 208 and one or more electric vehicle batteries during charging.

Still referring to FIGS. 2A and 2B, in some embodiments, one or more of at least a primary conductor 212 and auxiliary conductor 216 may be further configured to conduct a communication signal and/or control signal by way of power line communication. In some cases, computing device 112 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a conductor 208. Different types of power-line communications use different frequency bands. In some case, alternating current may have a frequency of about 50 or about 60 Hz. In some cases, power conductor 208 may be shielded in order to prevent emissions of power line communication modulation frequencies. Alternatively or additionally, power line communication modulation frequency may be within a range unregulated by radio regulators, for example below about 500 KHz.

Still referring to FIG. 2B, in some embodiments, housing of charging component 132 may be configured to mate with a test port. For example, test port may be identical to electric aircraft port. As used in this disclosure, a "test port" is port located outside of an electric vehicle that mates with connector. In some cases, test port may close a circuit with one or more conductors or flow paths within connector and thereby allow for said one more conductors or flow paths to be tested, for example for continuity, impedance, resistance, and the like. In some cases, test port may be configured to test functionality of one or more of the at least a direct current conductor, the at least an alternating current conductor, the at least a control signal conductor, the at least a ground conductor, the at least a cooling channel, and the at least a proximity conductor. Test port may facilitate one or more signals, for example feedback signals, to be communicated with computing device 112 as a function of charging component 132 being attached with test port. In some cases, test port may allow for verification that performance of charging component 132 is within specified limits. As used in this disclosure, "verification" is a process of ensuring that which is being "verified" complies with certain constraints, for example without limitation system requirements, regulations, and the like. In some cases, verification may include comparing a product, such as without limitation charging or cooling performance metrics, against one or more acceptance criteria. For example, in some cases, charging or cooling performance metrics, may be required to function according to prescribed constraints or specification. Ensuring that charging or cooling performance metrics are in compliance with acceptance criteria may, in some cases, constitute verification. In some cases, verification may include ensuring that data (e.g., performance metric data) is complete, for example that all required data types, are present, readable, uncorrupted, and/or otherwise useful for computing device 112. In some cases, some or all verification processes may be performed by computing device 112. In some cases, at least a machine-learning process, for example a machine-learning model, may be used to verify. Computing device 112 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Figure 3:
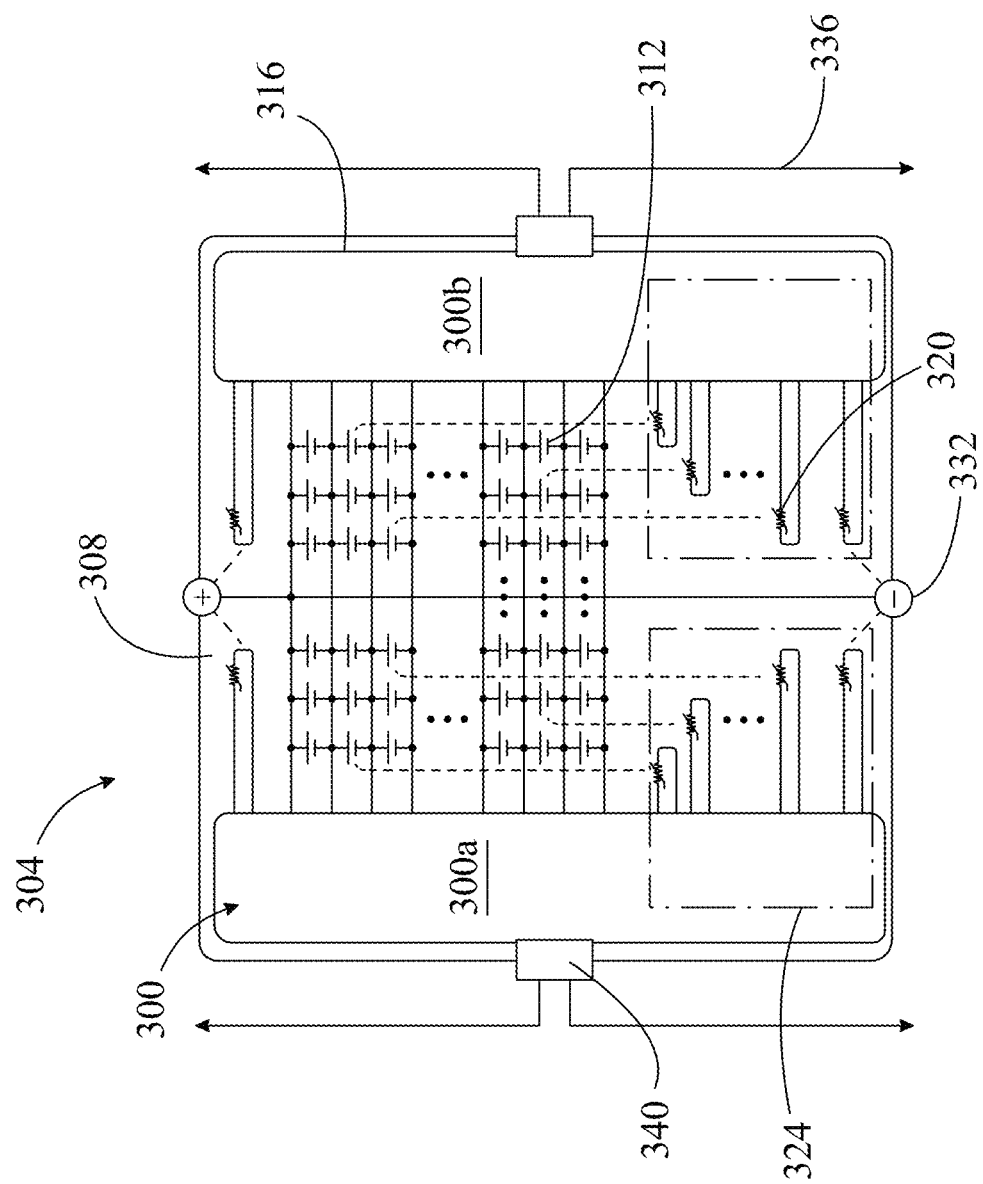
FIG. 3 is a block diagram of an exemplary embodiment of a module monitor unit in one or more aspect of the present disclosure.

Referring now to FIG. 3, an exemplary embodiment of a module monitor unit (MMU) 300 is presented in accordance with one or more embodiments of the present disclosure. In one or more embodiments, MMU 300 is configured to monitor an operating condition of a battery pack 304. For example, and without limitation, MMU 300 may monitor an operating condition of a battery module 308 and/or a battery cell 312 of battery pack 304. Battery pack 304 may be consistent with battery pack 160 in FIG. 1. In one or more embodiments, MMU 300 may be attached to battery module 308, as shown in FIG. 3. For example, and without limitation, MMU 300 may include a housing 316 that is attached to battery module 308, where circuitry of MMU 300 may be disposed at least partially therein, as discussed further in this disclosure. In other embodiments, MMU 300 may be remote to battery module 308. In one or more embodiments, housing 316 may include materials which possess characteristics suitable for thermal insulation, such as fiberglass, iron fibers, polystyrene foam, and thin plastic films, to name a few. Housing 316 may also include polyvinyl chloride (PVC), glass, asbestos, rigid laminate, varnish, resin, paper, Teflon, rubber, and mechanical lamina to physically isolate components of battery pack 304 from external components. In one or more embodiments, housing 316 may also include layers that separate individual components of MMU 300, which are discussed further below in this disclosure. As understood by one skilled in the art, housing 316 may be any shape or size suitable to attached to battery module 308 of battery pack 304.

In one or more embodiments, a plurality of MMUs 300 may be configured to monitor battery module 308 and/or battery cell 312. For instance, and without limitation, a first MMU 300a may be position at one end of battery module 308, and a second MMU 300b may be positioned at an opposing end of battery module 308. This arrangement may allow for redundancy in monitoring of battery cell 312. For example, and without limitation, if first MMU 300a fails, then second MMU 300b may continue to work properly and monitor the operating condition of each battery cell 312 of battery module 308. In one or more embodiments, MMU 300 may monitor the operating condition of a plurality of battery cells, as shown in FIG. 3.

In one or more embodiments, MMU 300 is configured to detect a measurement parameter of battery module 308. For the purposes of this disclosure, a "measurement parameter" is detected electrical or physical input, characteristic, and/or phenomenon related to a state of battery pack 304. For example, and without limitation, a measurement parameter may be a temperature, a voltage, a current, a moisture level/humidity, a gas level, or the like, as discussed further in this disclosure.

In one or more embodiments, MMU 300 is configured to perform load-sharing during the charging of battery pack 304. For instance, MMU 300 may regulate charge levels of battery cells 312. For example, charging of battery pack 304 may be shared throughout a plurality of battery cells 312 by directing energy through balance resistors and dissipating current through resistors as heat. For example, and without limitation, resistor may include a nonlinear resistor, such as a thermistor 320. In this manner, battery cells 312 may be charged evenly during recharging of battery pack 304 by, for example, a charging station or an electric grid. For example, and without limitation, battery cells with a lower amount of electrical energy will charge more than battery cells with a greater amount of energy.

In one or more embodiments, MMU 300 is configured to monitor a temperature of battery module 308. For example, MMU 300 may include a sensor 324 configured to detect a temperature parameter of battery cell 312. For example, and without limitation, sensor 324 may include thermistor 320, which may be used to measure a temperature parameter of battery cell 312. As used in this disclosure, a thermistor includes a resistor having a resistance dependent on temperature. In one or more embodiments, sensor 324 may include circuitry configured to generate a measurement datum correlated to the detected measurement parameter, such as a temperature of battery cell 312 detected by thermistor 320. A thermistor may include metallic oxides, epoxy, glass, and the like. A thermistor may include a negative temperature coefficient (NTC) or a positive temperature coefficient (PTC). Thermistors may be beneficial due to being durable, compact, inexpensive, and relatively accurate. In one or more embodiments, a plurality of thermistors 320 may be used to provide redundant measuring of a state of battery cell 312, such as temperature. In other embodiments, MMU 300 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 320 may detect a temperature of battery cell 312. Subsequently, MMU 300 may generate a sensor signal output containing information related to the detected temperature of battery cell 312. In one or more embodiments, sensor signal output may include measurement datum containing information representing a detected measurement parameter.

In one or more embodiments, sensor 324 may include a sensor suite 300 (shown in FIG. 3) or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 324 may be a contact or a non-contact sensor. For example, and without limitation, sensor 324 may be connected to battery module 308 and/or battery cell 312. In other embodiments, sensor 324 may be remote to battery module and/or battery cell 312. Sensor 324 may be communicatively connected to controller 420 of PMU 412 (shown in FIG. 4) so that sensor 324 may transmit/receive signals to/from controller 420, respectively, as discussed below in this disclosure. Signals, such as signals of sensor 324 and controller 420, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

Figure 4:
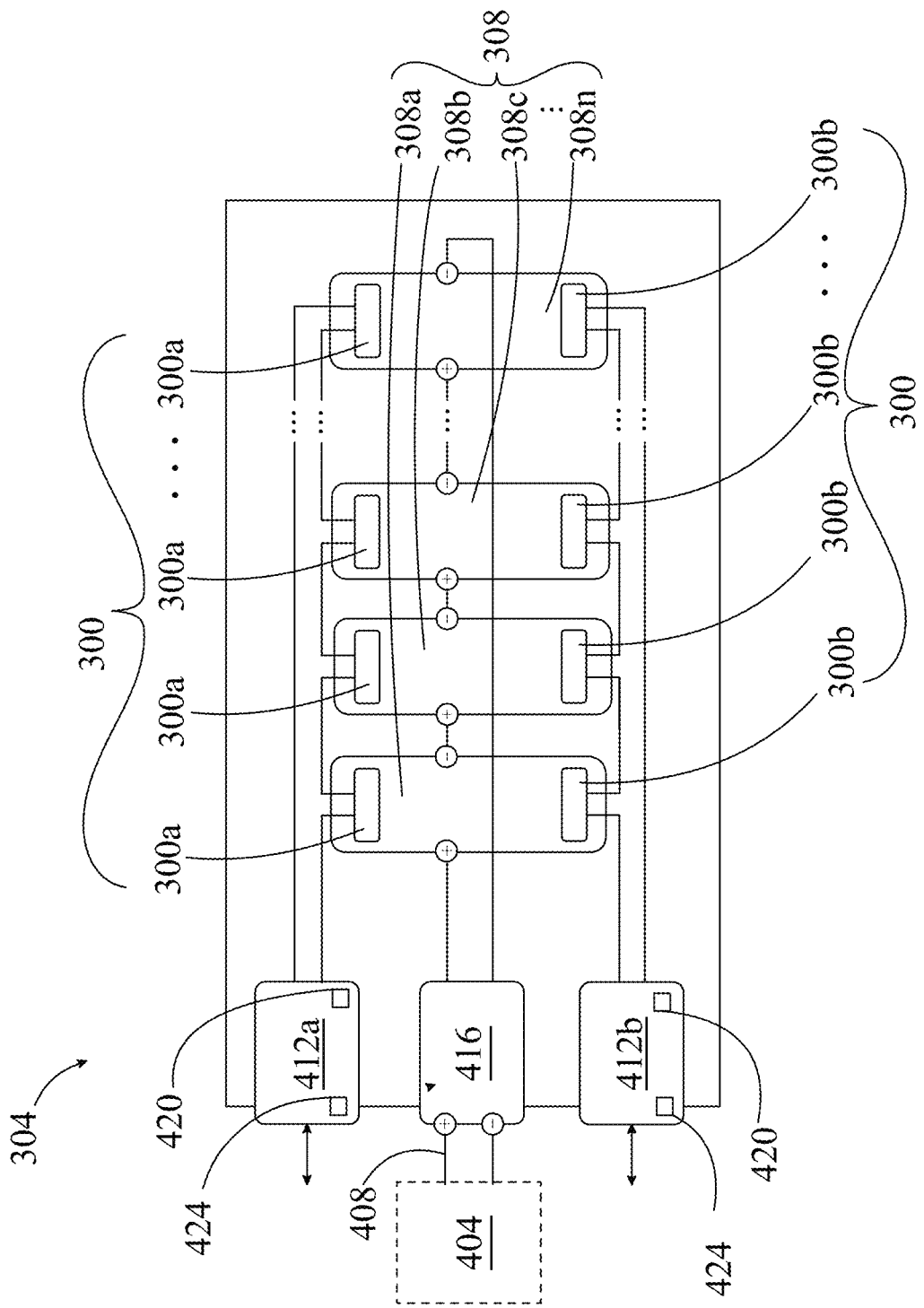
FIG. 4 is a block diagram of an exemplary embodiment of a battery pack in one or more aspects of the present disclosure.

In one or more embodiments, MMU 300 may include a control circuit that processes the received measurement datum from sensor 324, as shown in FIG. 4. In one or more embodiments, control circuit may be configured to perform and/or direct any actions performed by MMU 300 and/or any other component and/or element described in this disclosure. Control circuit may include any analog or digital control circuit, including without limitation a combinational and/or synchronous logic circuit, a processor, microprocessor, microcontroller, any combination thereof, or the like. In some embodiments, control circuit 328 may be integrated into MMU 300, as shown in FIG. 3. In other embodiments, control circuit 328 may be remote to MMU 300. In one or more nonlimiting exemplary embodiments, if measurement datum of a temperature of a battery module 308, such as at a terminal 332, is higher than a predetermined threshold, control circuit 328 may determine that the temperature of battery cell 312 indicates a critical event and thus is malfunctioning. For example, a high voltage (HV) electrical connection of battery module terminal 332 may be short circuiting. If control circuit 328 determines that a HV electrical connection is malfunctioning, control circuit 328 may terminate a physical and/or electrical communication of the HV electrical connection to prevent a dangerous or detrimental reaction, such as a short, that may result in an electrical shock, damage to battery pack 304, or even a fire. Thus, control circuit 328 may trip a circuit of battery pack 304 and terminate power flow through the faulty battery module 308 until the detected fault is corrected and/or the excessively high temperature is no longer detected. Temperature sensors, such as thermistor 320 may assist in the monitoring of a cell group's overall temperature, an individual battery cell's temperature, and/or battery module's temperature, as just described above.

In one or more embodiments, MMU 300 may not use software. For example, MMU 300 may not use software to improve reliability and durability of MMU 300. Rather, MMU 300 may be communicatively connected to a remote computing device, such as computing device 800 of FIG. 9. In one or more embodiments, MMU 300 may include one or more circuits and/or circuit elements, including without limitation a printed circuit board component, aligned with a first side of battery module 308 and the openings correlating to battery cells 312. In one or more embodiments, MMU 300 may be communicatively connected to a remote processing module, such as a controller.

Controller may be configured to perform appropriate processing of detected temperature characteristics by sensor 324. In one or more embodiments, controller ** may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 308. In these and other embodiments, controller may operate in conjunction with other components, such as, a memory component, where a memory component includes a volatile memory and/or a non-volatile memory.

In one or more embodiments, each MMU 300 may communicate with another MMU 300 and/or a controller via a communicative connection 336. Each MMU may use a wireless and/or wired connection to communicated with each other. For example, and without limitation, MMU 300a may communicate with an adjacent MMU 300a using an isoSPI connection 404 (shown in FIG. 4). As understood by one skilled in the art, and isoSPI connection may include a transformer to magnetically connect and electrically isolate a signal between communicating devices.

Now referring to FIG. 4, a battery pack 160 with a battery management component 400 that utilizes MMU 300 for monitoring a status of battery pack is shown in accordance with one or more embodiments of the present disclosure. In one or more embodiments, electric aircraft battery pack 160 may include a battery module 308, which is configured to provide energy to an electric aircraft 404 via a power supply connection 408. For the purposes of this disclosure, a "power supply connection" is an electrical and/or physical communication between a battery module 308 and electric aircraft 404 that powers electric aircraft 404 and/or electric aircraft subsystems for operation. In one or more embodiments, battery pack 160 may include a plurality of battery modules, such as modules 308a-n. For example, and without limitation, battery pack 160 may include fourteen battery modules. In one or more embodiments, each battery module 308a-n may include a battery cell 312 (shown in FIG. 3).

Still referring to FIG. 4, battery pack 160 may include a battery management component 320 (also referred to herein as a "management component"). In one or more embodiments, battery management component 400 may be integrated into battery pack 160 in a portion of battery pack 160 or a subassembly thereof. In an exemplary embodiment, and without limitation, management component 400 may be disposed on a first end of battery pack 160. One of ordinary skill in the art will appreciate that there are various areas in and on a battery pack and/or subassemblies thereof that may include battery management component 400. In one or more embodiments, battery management component 400 may be disposed directly over, adjacent to, facing, and/or near a battery module and specifically at least a portion of a battery cell. In one or more embodiments, battery management component 400 includes module monitor unit (MMU) 300, a pack monitoring unit (PMU) 412, and a high voltage disconnect 416. In one or more embodiments, battery management component 400 may also include a sensor 324. For example, and without limitation, battery management component 400 may include a sensor suite 300 having a plurality of sensors, as discussed further in this disclosure, as shown in FIG. 3.

In one or more embodiments, MMU 300 may be mechanically connected and communicatively connected to battery module 308. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 300 is configured to detect a measurement characteristic of battery module 308 of battery pack 160. For the purposes of this disclosure, a "measurement characteristic" is detected electrical or physical input and/or phenomenon related to a condition state of battery pack 160. A condition state may include detectable information related to, for example, a temperature, a moisture level, a humidity, a voltage, a current, vent gas, vibrations, chemical content, or other measurable characteristics of battery pack 160, battery module 308, and/or battery cell 312. For example, and without limitation, MMU 300 may detect and/or measure a measurement characteristic, such as a temperature, of battery module 308. In one or more embodiments, a condition state of battery pack 160 may include a condition state of a battery module 308 and/or battery cell 312. In one or more embodiments, MMU 300 may include a sensor, which may be configured to detect and/or measure measurement characteristic. As used in this disclosure, a "sensor" is a device that is configured to detect an input and/or a phenomenon and transmit information and/or datum related to the detection, as discussed further below in this disclosure. Output signal may include a sensor signal, which transmits information and/or datum related to the sensor detection. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

In one or more embodiments, MMU 300 is configured to transmit a measurement datum of battery module 308. MMU 300 may generate an output signal such as measurement datum that includes information regarding detected measurement characteristic. For the purposes of this disclosure, "measurement datum" is an electronic signal representing an information and/or a parameter of a detected electrical and/or physical characteristic and/or phenomenon correlated with a condition state of battery pack 160. For example, measurement datum may include data of a measurement characteristic regarding a detected temperature of battery cell 312. In one or more embodiments, measurement datum may be transmitted by MMU 300 to PMU 412 so that PMU 412 may receive measurement datum, as discussed further in this disclosure. For example, MMU 300 may transmit measurement data to a controller 420 of PMU 412.

In one or more embodiments, MMU 300 may include a plurality of MMUs. For instance, and without limitation, each battery module 308a-n may include one or more MMUs 300. For example, and without limitation, each battery module 308a-n may include two MMUs 300a,b. MMUs 300a,b may be positioned on opposing sides of battery module 308. Battery module 308 may include a plurality of MMUs to create redundancy so that, if one MMU fails or malfunctions, another MMU may still operate properly. In one or more nonlimiting exemplary embodiments, MMU 300 may include mature technology so that there is a low risk. Furthermore, MMU 300 may not include software, for example, to avoid complications often associated with programming. MMU 300 is configured to monitor and balance all battery cell groups of battery pack 160 during charging of battery pack 160. For instance, and without limitation, MMU 300 may monitor a temperature of battery module 308 and/or a battery cell of battery module 308. For example, and without limitation, MMU may monitor a battery cell group temperature. In another example, and without limitation, MMU 300 may monitor a terminal temperature to, for example, detect a poor HV electrical connection. In one or more embodiments, an MMU 300 may be indirectly connected to PMU 412. In other embodiments, MMU 300 may be directly connected to PMU 412. In one or more embodiments, MMU 300 may be communicatively connected to an adjacent MMU 300.

Still referring to FIG. 4, battery management component 400 includes a pack monitoring unit (PMU) 328 may be connected to MMU 300. In one or more embodiments, PMU 412 includes a controller 420, which is configured to receive measurement datum from MMU 300, as previously discussed in this disclosure. For example, PMU 412a may receive a plurality of measurement data from MMU 300a. Similarly, PMU 412b may receive a plurality of measurement data from MMU 300b. In one or more embodiments, PMU 412 may receive measurement datum from MMU 300 via communicative connections. For example, PMU 412 may receive measurement datum from MMU 300 via an isoSPI communications interface. In one or more embodiments, controller 420 of PMU 412 is configured to identify an operating of battery module 308 as a function of measurement datum. For the purposes of this disclosure, an "operating condition" is a state and/or working order of battery pack 160 and/or any components thereof. For example, and without limitation, an operating condition may include a state of charge (SoC), a depth of discharge (DoD), a temperature reading, a moisture level or humidity, a gas level, a chemical level, or the like. In one or more embodiments, controller 420 of PMU 412 is configured to determine a critical event element if operating condition is outside of a predetermined threshold (also referred to herein as a "predetermined threshold"). For the purposes of this disclosure, a "critical event element" is a failure and/or critical operating condition of a battery pack, battery cell, and/or battery module that may be harmful to battery pack 160 and/or electric aircraft 404. For instance, and without limitation, if an identified operating condition, such as a temperature of a battery cell 312 of battery pack 160, does not fall within a predetermined threshold, such as a range of acceptable, operational temperatures of the battery cell, then a critical event element is determined by controller 420 of PMU 412. For example, and without limitation, PMU may be used measurement datum from MMU to identify a temperature of 95 degrees Fahrenheit for a battery cell. If the predetermined threshold is, for example, 75 to 90 degrees Fahrenheit, then the determined operating condition is outside of the predetermined threshold, such as exceeding the upper limit of 90 degrees Fahrenheit, and a critical event element is determined by controller 420. As used in this disclosure, a "predetermined threshold" is a limit and/or range of an acceptable quantitative value and/or representation related to a normal operating condition of a battery pack and/or components thereof. In one or more embodiments, an operating condition outside of the threshold is a critical operating condition, which triggers a critical event element, and an operating condition within the threshold is a normal operating condition that indicates that battery pack 160 is working properly. For example, and without limitation, if an operating condition of temperature exceeds a predetermined threshold, then battery pack is considered to be operating at a critical operating condition and may be at risk of overheating and experiencing a catastrophic failure.

In one or more embodiments, controller 420 of PMU 412 is configured to generate an action command if critical event element is determined by controller 420. Continuing the previously described example above, if an identified operating condition includes a temperature of 95 degrees Fahrenheit, which exceeds a predetermined threshold, then controller 420 may determine a critical event element indicating that battery pack 160 is working at a critical temperature level and at risk of catastrophic failure. In one or more embodiments, critical event elements may include high shock/drop, overtemperature, undervoltage, high moisture, contactor welding, and the like.

In one or more embodiments, controller 420 may include a computing device (as discussed in FIG. 9), a central processing unit (CPU), a microprocessor, a digital signal processor (DSP), an application specific integrated circuit (ASIC), a control circuit, a combination thereof, or the like. In one or more embodiments, output signals from various components of battery pack 160 may be analog or digital. Controller 420 may convert output signals from MMU 300 and/or sensor 324 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 412 may run state estimation algorithms.

In one or more embodiments, MMU 300 may be implemented in battery management system 400 of battery pack 160. MMU 300 may include sensor 324, as previously mentioned above in this disclosure. For instance, and without limitation, MMU 300 may include a plurality of sensors. For example, MMU 300 may include thermistors 320 to detect a temperature of a corresponding battery module 308 and/or battery cell 312. MMU 300 may include sensor 320 or a sensor suite, such as sensor suite 300 of FIG. 3, that is configured to measure physical and/or electrical parameters of battery pack 160, such as without limitation temperature, voltage, current, orientation, or the like, of one or more battery modules and/or battery cells 312. MMU 300 may be configured to generate a measurement datum of each battery cell 312, which a control circuit may ultimately use to determine a failure within battery module 308 and/or battery cell 312, such as a critical event element. Cell failure may be characterized by a spike in temperature and MMU 300 may be configured to detect that increase, which in turn, PMU 412 uses to determine a critical event element and generate signals, to disconnect a power supply connection between electric aircraft ** and battery cell 312 and to notify users, support personnel, safety personnel, maintainers, operators, emergency personnel, aircraft computers, or a combination thereof. In one or more embodiments, measurement data of MMU may be stored in memory component 424.

Still referring to FIG. 4, battery management component 400 may include high voltage disconnect 332, which is communicatively connected to battery module 308, wherein high voltage disconnect 332 is configured to terminate power supply connection 312 between battery module 308 and electric aircraft 404 in response to receiving action command from PMU 412. PMU 412 may be configured to determine a critical event element, such as high shock/drop, overtemperature, undervoltage, contactor welding, and the like. High voltage disconnect 332 is configured to receive action command generated by PMU 412 and lock out battery pack 160 for maintenance in response to received action command. In one or more embodiments, PMU 412 may create a lockout flag, which may be saved across reboots. A lockout flag may include an indicator alerting a user of termination of power supply connection 312 by high voltage disconnect 332. For instance, and without limitation, a lockout flag may be saved in a database od PMU 412 so that, despite rebooting battery pack 160 or complete loss of power of battery pack 160, power supply connection remains terminated and an alert regarding the termination remains. In one or more embodiments, lockout flag cannot be removed until a critical event element is no longer determined by controller 420. For, example, PMU 412 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on battery pack 160. In one or more embodiments, PMU 412 may include control of cell group balancing via MMUs, control of contactors (high voltage connections, etc.) control of welding detection, control of pyro fuses, and the like.

In one or more embodiments, battery management component 400 may include a plurality of PMUs 412. For instance, and without limitation, battery management component 400 may include a pair of PMUs. For example, and without limitation, battery management component 400 may include a first PMU 412a and a second PMU 412b, which are each disposed in or on battery pack 160 and may be physically isolated from each other. "Physical isolation", for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the non-limiting exemplary embodiment, first PMU 412a and second PMU 412b may perform the same or different functions. For example, and without limitation, the first and second PMUs 412a,b may perform the same, and therefore, redundant functions. Thus, if one PMU 412a/b fails or malfunctions, in whole or in part, the other PMU 412b/a may still be operating properly and therefore battery management component 400 may still operate and function properly for battery pack 160. One of ordinary skill in the art would understand that the terms "first" and "second" do not refer to either PMU as primary or secondary. In non-limiting embodiments, the first and second PMUs 412a,b, due to their physical isolation, may be configured to withstand malfunctions or failures in the other system and survive and operate. Provisions may be made to shield first PMU 412a from PMU 412b other than physical location, such as structures and circuit fuses. In non-limiting embodiments, first PMU 412a, second PMU 412b, or subcomponents thereof may be disposed on an internal component or set of components within battery pack 160, such as on battery module sense board, as discussed further below in this disclosure.

Still referring to FIG. 4, first PMU 412a may be electrically isolated from second PMU 412b. "Electrical isolation", for the purposes of this disclosure, refer to a first system's separation of components carrying electrical signals or electrical energy from a second system's components. First PMU 412a may suffer an electrical catastrophe, rendering it inoperable, and due to electrical isolation, second PMU 412b may still continue to operate and function normally, allowing for continued management of battery pack 160 of electric aircraft 404. Shielding such as structural components, material selection, a combination thereof, or another undisclosed method of electrical isolation and insulation may be used, in nonlimiting embodiments. For example, and without limitation, a rubber or other electrically insulating material component may be disposed between electrical components of first and second PMUs 412a,b, preventing electrical energy to be conducted through it, isolating the first and second PMUs 412a,b form each other.

With continued reference to FIG. 4, battery management component 400 may include memory component 424, as previously mentioned above in this disclosure. In one or more embodiments, memory component 424 may be configured to store datum related to battery pack 160, such as data related to battery modules 308a-n and/or battery cells 312. For example, and without limitation, memory component 424 may store sensor datum, measurement datum, operation condition, critical event element, lockout flag, and the like. Memory component 424 may include a database. Memory component 424 may include a solid-state memory or tape hard drive. Memory component 424 may be communicatively connected to PMU 412 and may be configured to receive electrical signals related to physical or electrical phenomenon measured and store those electrical signals as battery module data. Alternatively, memory component 424 may be a plurality of discrete memory components that are physically and electrically isolated from each other. One of ordinary skill in the art would understand the virtually limitless arrangements of data stores with which battery pack 160 could employ to store battery pack data.

Figure 5:
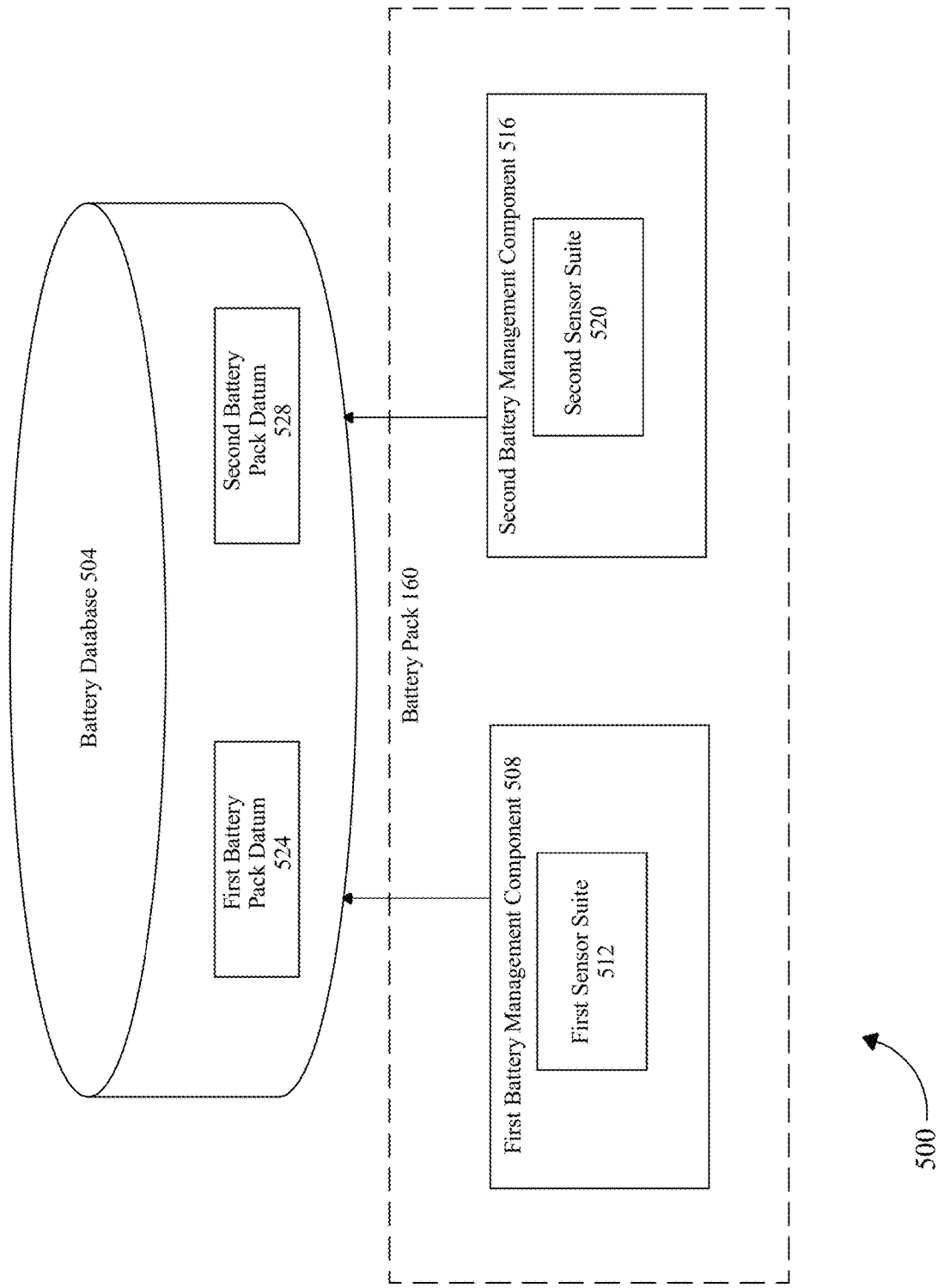
FIG. 5 is a block diagram of an exemplary embodiment of a battery management system.

Referring now to FIG. 5, an embodiment of battery management system 500 is presented. Battery management system 500 is be integrated in a battery pack 160 configured for use in an electric aircraft. The battery management system 500 is be integrated in a portion of the battery pack 160 or subassembly thereof. Battery management system 500 includes first battery management component 508 disposed on a first end of the battery pack. One of ordinary skill in the art will appreciate that there are various areas in and on a battery pack and/or subassemblies thereof that may include first battery management component 508. First battery management component 508 may take any suitable form. In a non-limiting embodiment, first battery management component 508 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 508 may be soldered or otherwise electrically connected to a circuit board. First battery management component may be disposed directly over, adjacent to, facing, and/or near a battery module and specifically at least a portion of a battery cell. First battery management component 508 includes first sensor suite 512. First sensor suite 512 is configured to measure, detect, sense, and transmit first plurality of battery pack datum 524 to battery database 504.

Referring again to FIG. 5, battery management system 500 includes second battery management component 516. For instance and without limitation, battery management system may be consistent with disclosure of battery management system in U.S. patent application Ser. No. 17/108, 798 and titled "SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Second battery management component 516 is disposed in or on a second end of battery pack 160. Second battery management component 516 includes second sensor suite 520. Second sensor suite 520 may be consistent with the description of any sensor suite disclosed herein. Second sensor suite 520 is configured to measure second plurality of battery pack datum 528. Second plurality of battery pack datum 528 may be consistent with the description of any battery pack datum disclosed herein. Second plurality of battery pack datum 528 may additionally or alternatively include data not measured or recorded in another section of battery management system 500. Second plurality of battery pack datum 528 may be communicated to additional or alternate systems to which it is communicatively coupled. Second sensor suite 520 includes a moisture sensor consistent with any moisture sensor disclosed herein, namely moisture sensor 508.

With continued reference to FIG. 5, first battery management component 508 disposed in or on battery pack 160 may be physically isolated from second battery management component 516 also disposed on or in battery pack 160. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. In a non-limiting embodiment, the plurality of the first and second battery management component may be outside the battery pack 160. First battery management component 508 and second battery management component 516 may perform the same or different functions in battery management system 500. In a non-limiting embodiment, the first and second battery management components perform the same, and therefore redundant functions. If, for example, first battery management component 508 malfunctions, in whole or in part, second battery management component 516 may still be operating properly and therefore battery management system 500 may still operate and function properly for electric aircraft in which it is installed. Additionally or alternatively, second battery management component 516 may power on while first battery management component 508 is malfunctioning. One of ordinary skill in the art would understand that the terms "first" and "second" do not refer to either "battery management components" as primary or secondary. In non-limiting embodiments, first battery management component 508 and second battery management component 516 may be powered on and operate through the same ground operations of an electric aircraft and through the same flight envelope of an electric aircraft. This does not preclude one battery management component, first battery management component 508, from taking over for second battery management component 516 if it were to malfunction. In non-limiting embodiments, the first and second battery management components, due to their physical isolation, may be configured to withstand malfunctions or failures in the other system and survive and operate. Provisions may be made to shield first battery management component 508 from second battery management component 516 other than physical location such as structures and circuit fuses. In non-limiting embodiments, first battery management component 508, second battery management component 516, or subcomponents thereof may be disposed on an internal component or set of components within battery pack 160, such as on battery module sense board 504.

Referring again to FIG. 5, first battery management component 508 may be electrically isolated from second battery management component 516. "Electrical isolation", for the purposes of this disclosure, refer to a first system's separation of components carrying electrical signals or electrical energy from a second system's components. First battery management component 508 may suffer an electrical catastrophe, rendering it inoperable, and due to electrical isolation, second battery management component 516 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 5, battery management system 500 includes battery database 504. Battery database 504 is configured to store first plurality of battery pack datum 524 and second plurality of battery pack datum 528. Battery database 504 may include a database. Battery database 504 may include a solid-state memory or tape hard drive. Battery database 504 may be communicatively coupled to first battery management component 508 and second battery management component 516 and may be configured to receive electrical signals related to physical or electrical phenomenon measured and store those electrical signals as first battery pack datum 524 and second battery pack datum 528, respectively. Alternatively, battery database 504 may include more than one discrete battery databases that are physically and electrically isolated from each other. In this non-limiting embodiment, each of first battery management component 508 and second battery management component 516 may store first battery pack datum 524 and second battery pack datum 528 separately. One of ordinary skill in the art would understand the virtually limitless arrangements of data stores with which battery management system 500 could employ to store the first and second plurality of battery pack datum.

Referring again to FIG. 5, battery database 504 stores first plurality of battery pack datum 524 and second plurality of battery pack datum 528. First plurality of battery pack datum 524 and second plurality of battery pack datum 528 may include total flight hours that battery pack 160 and/or electric aircraft have been operating. The first and second plurality of battery pack datum may include total energy flowed through battery pack 160. Battery database 504 may be implemented, without limitation, as a relational database, a key-value retrieval datastore such as a NOSQL database, or any other format or structure for use as a datastore that a person skilled in the art would recognize as suitable upon review of the entirety of this disclosure. Battery database 504 may contain datasets that may be utilized by an unsupervised machine-learning model to find trends, cohorts, and shared datasets between data contained within battery database 504 and first battery pack datum 524 and/or second battery pack datum 528. In an embodiment, datasets contained within battery database 504 may be categorized and/or organized according to shared characteristics. For instance and without limitation, one or more tables contained within battery database 504 may include first battery pack datum table. First battery pack datum table may contain datasets classified to first battery pack information of first battery pack datum. First battery pack information may include datasets describing any first battery pack datum as described herein. One or more tables contained within battery database 504 may include a second battery pack datum table. second battery pack datum table may contain datasets classified to second battery pack information of second battery pack datum. Second battery pack information may include datasets describing any second battery pack datum as described herein. One or more tables contained within battery database 504 may include a comparison datum table. Comparison datum table may include datasets classified by level of comparison between first battery pack datum 524 and second battery pack datum 528. Comparison datum table may include datasets classified by the severity of the difference of the comparison of the first and second battery pack datum from the differential threshold. Battery database 504 may be communicatively coupled to sensors that detect, measure and store energy in a plurality of measurements which may include current, voltage, resistance, impedance, coulombs, watts, temperature, or a combination thereof. Additionally or alternatively, battery database 504 may be communicatively coupled to a sensor suite consistent with this disclosure to measure physical and/or electrical characteristics. Battery database 504 may be configured to store first battery pack datum 524 and second battery pack datum 528 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Battery database 504 may store the first and second battery pack datum that includes an upper voltage threshold and lower voltage threshold consistent with this disclosure. First battery pack datum 524 and second battery pack datum 528 may include a moisture level threshold. The moisture level threshold may include an absolute, relative, and/or specific moisture level threshold. Battery management system 500 may be designed to the Federal Aviation Administration (FAA)'s Design Assurance Level A (DAL-A), using redundant DAL-B subsystems.

With continued reference to FIG. 5, battery management system 500 may include a data collection system, which may include a central sensor suite which may be used for first sensor suite 512 in first battery management component 160 or second sensor suite 520 in second battery management component 212 or consistent with any sensor suite disclosed hereinabove. Data collection system includes battery database 504. Central sensor suite is configured to measure physical and/or electrical phenomena and characteristics of battery pack 160, in whole or in part. Central sensor suite then transmits electrical signals to battery database 504 to be saved. Those electrical signals are representative of first battery pack datum 524 and second battery pack datum 528. The electrical signals communicated from central sensor suite, and more moreover from the first or second battery management component 516 to which it belongs may be transformed or conditioned consistent with any signal conditioning present in this disclosure. Data collection system and more specifically first battery management component 160, may be configured to save first battery pack datum 524 and second battery pack datum 528 periodically in regular intervals to battery database 504. "Regular intervals", for the purposes of this disclosure, refers to an event taking place repeatedly after a certain amount of elapsed time. Data collection system may include first battery management component 160, which may include timer 504. Timer 504 may include a timing circuit, internal clock, or other circuit, component, or part configured to keep track of elapsed time and/or time of day. For example, in non-limiting embodiments, battery database 504 may save the first and second battery pack datum every 30 seconds, every minute, every 30 minutes, or another time period according to timer module 172. Additionally or alternatively, battery database 504 may save the first and second battery pack datum after certain events occur, for example, in non-limiting embodiments, each power cycle, landing of the electric aircraft, when battery pack is charging or discharging, or scheduled maintenance periods. In non-limiting embodiments, battery pack 160 phenomena may be continuously measured and stored at an intermediary storage location, and then permanently saved by battery database 504 at a later time, like at a regular interval or after an event has taken place as disclosed hereinabove. Additionally or alternatively, battery database may be configured to save first battery pack datum 524 and second battery pack datum 528 at a predetermined time. "Predetermined time", for the purposes of this disclosure, refers to an internal clock within battery management system 500 commanding battery database 504 to save the first and second battery pack datum at that time. For example, battery database 504 may be configured to save the first and second battery pack datum at 0600 hours, 11 P.M. EDT, another time, multiple times a day, and/or the like.

Figure 6:
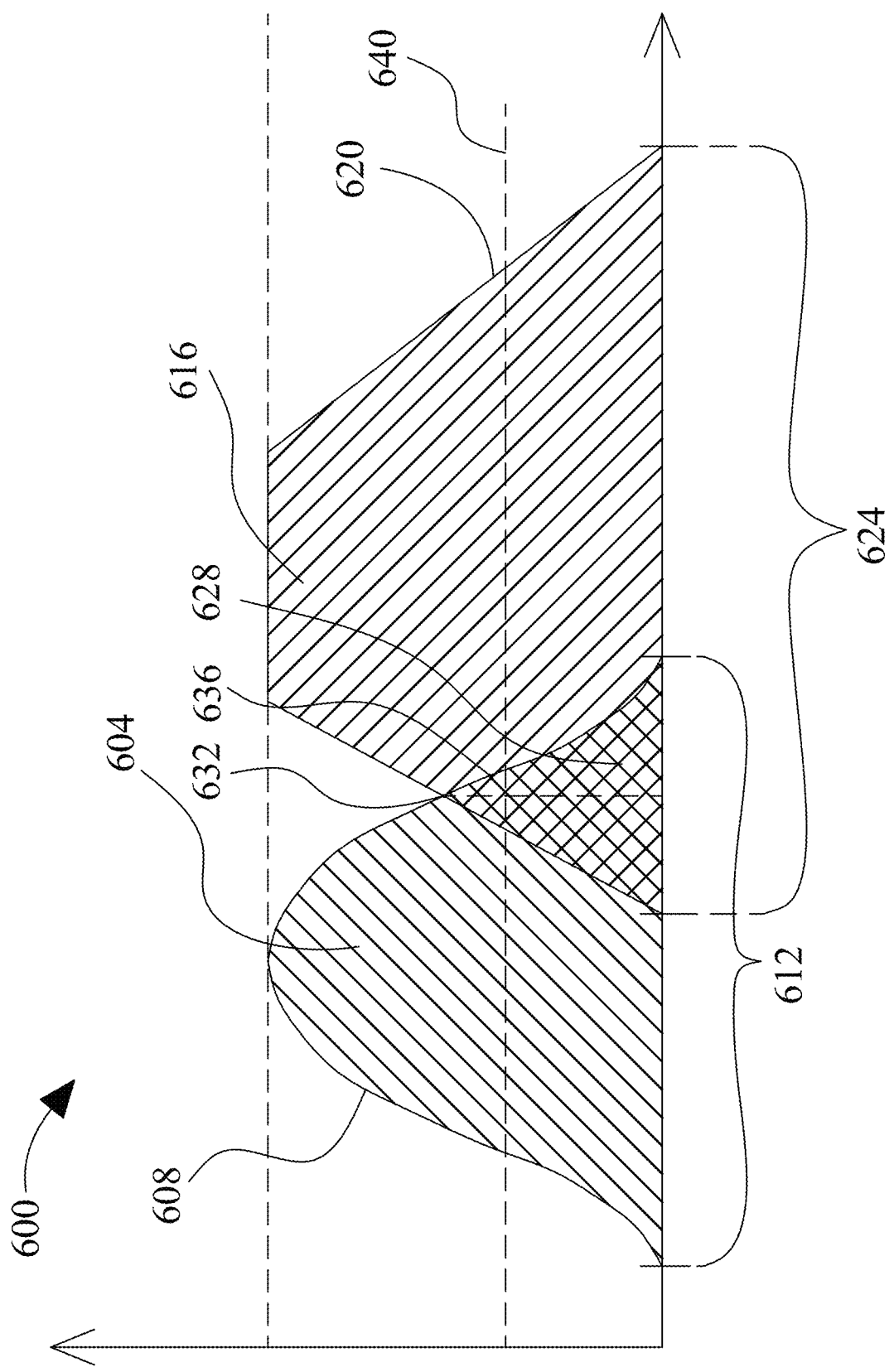
FIG. 6 is a diagrammatic representation of an exemplary embodiments of fuzzy sets for a residual threshold.

Now referring to FIG. 6, an exemplary embodiment of fuzzy set comparison 600 for a threshold is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 6, first fuzzy set 604 may represent any value or combination of values as described above, including any fault element 116 such as, but not limited to, rate of charge, rate of discharge, state of health, and the like thereof. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process. For example and without limitation, the threshold may indicate a sufficient degree of overlap between residual element 116 and a value representing a potential residual element that may indicate a sufficient match for purposes of generating alert datum 124 and/or determining whether residual element 116 indicates a threat of a danger posed by a residual current. For example and without limitation, sensor 104 may detect an abnormally a high current flow from charging component 132, which may be indicative of a leakage current. Computing device 112 may denote this event as a means to generate alert datum 124. Each threshold may be established by one or more user inputs. Alternatively or additionally, each threshold may be tuned by a machine-learning and/or statistical process, for instance and without limitation as described in further detail below.

With continued reference to FIG. 6, in an embodiment, a degree of match between fuzzy sets may be used to rank one resource against another. For instance, if two predictive prevalence values have fuzzy sets matching a probabilistic outcome fuzzy set by having a degree of overlap exceeding a threshold, computing device 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple residual element 116 and/or alert datum 124 may be presented to a user in order of ranking for purposes of generating and executing security protocol 120.

Figure 7:
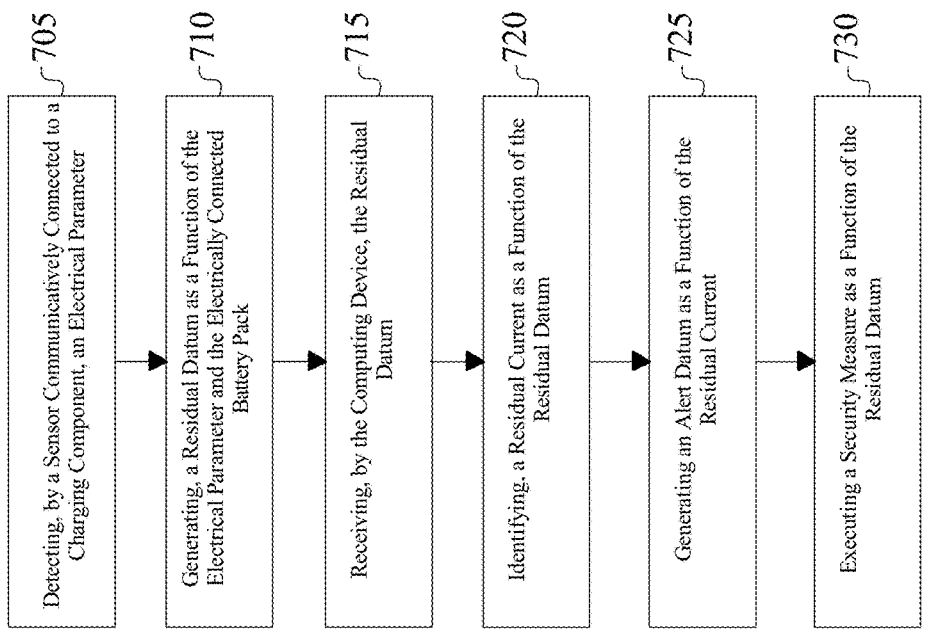
FIG. 7 is a flow diagram of an exemplary method for managing residual energy for an electric aircraft.

Now referring to FIG. 7, a flow diagram of an exemplary method 700 for managing residual energy for an electric aircraft is provided. Method 700, at step 705, may include detecting, by a sensor communicatively connected to a charging component, an electrical parameter of the charging component and an electrically connected battery pack. The sensor may include any sensor as described herein. The charging component may include any charging component as described herein. The plurality of measure charge data may include any plurality of measure charge data as described herein. In a non-limiting embodiment, method 700 may include establishing a connection between charging component and electric aircraft and/or electric aircraft port. The electric aircraft port may include any electric aircraft port as described herein. The connection may include any connection as described herein. In a non-limiting embodiment, method 700 may include the sensor receiving the battery pack datum once the connection is successful.

With continued reference to FIG. 7, method 700, at step 710, may include generating a residual datum as a function of the at least an electrical parameter and the battery pack datum. The residual datum may include any residual datum as described herein. In a non-limiting embodiment, generating the residual datum may include prioritizing and capturing any spikes of alternating current. Persons skilled in the art, upon reviewing the entirety of this disclosure, will be aware of the various methods of capturing and prioritizing specific data for purposes as described herein.

With continued reference to FIG. 7, method 700, at step 715, may include receiving, by a computing device, the residual datum. The computing device may include any computing device as described herein. In a non-limiting embodiment, method 700 may include receiving any datum as a function of a network and/or network communication. The network may include any network as described herein. The network communication may include any network communication as described herein. In a non-limiting embodiment, method 700 may include receiving, by the computing device, any datum using physical CAN bus units. The physical CAN bus unit may include any physical CAN bus unit as described herein.

With continued reference to FIG. 7, method 700, at step 720, may include identifying a residual element as a function of the residual datum. The residual element may include any residual element as described herein. In a non-limiting embodiment, method 700 may include continuously monitoring the source of the residual element.

With continued reference to FIG. 7, method 700, at step 725, may include generating an alert datum as a function of the residual element. The alert datum may include any alert datum as described herein. In a non-limiting embodiment, method 700 may include comparing the residual element with a residual prediction datum. The residual prediction datum may be generated by computing device. The residual prediction datum may include any residual prediction datum as described herein. In a non-limiting embodiment, method 700 may include determining that the residual element is indeed a residual current, at least in part, to generate alert datum 124, as a function of a residual threshold. The residual threshold may include any residual threshold as described herein. Method 700, at step 730, may include using a timer module. The timer module may include any timer module as described herein.

With continued reference to FIG. 7, method 700, at step 730, may include executing a security measure as a function of the alert datum. The security measure may include any security measure as described herein. In a non-limiting embodiment, method 700 may include generating the security measure using at least a machine-learning model and a residual training set. The machine-learning model may include any machine-learning model as described herein. The residual training set may include any residual training set as described herein. In a non-limiting embodiment, method 700, at step 735, may include generating a security measure as a function of operating a first mode. The first mode may include any first mode as described herein. Method 700, at step 735, may further include generating a security measure as a function of operating a second mode. The second mode may include any second mode as described herein. Persons skilled in the art, upon reviewing the entirety of this disclosure, will be aware of the various methods of using one or more modes within the computing device for purposes as described herein.

Figure 8:
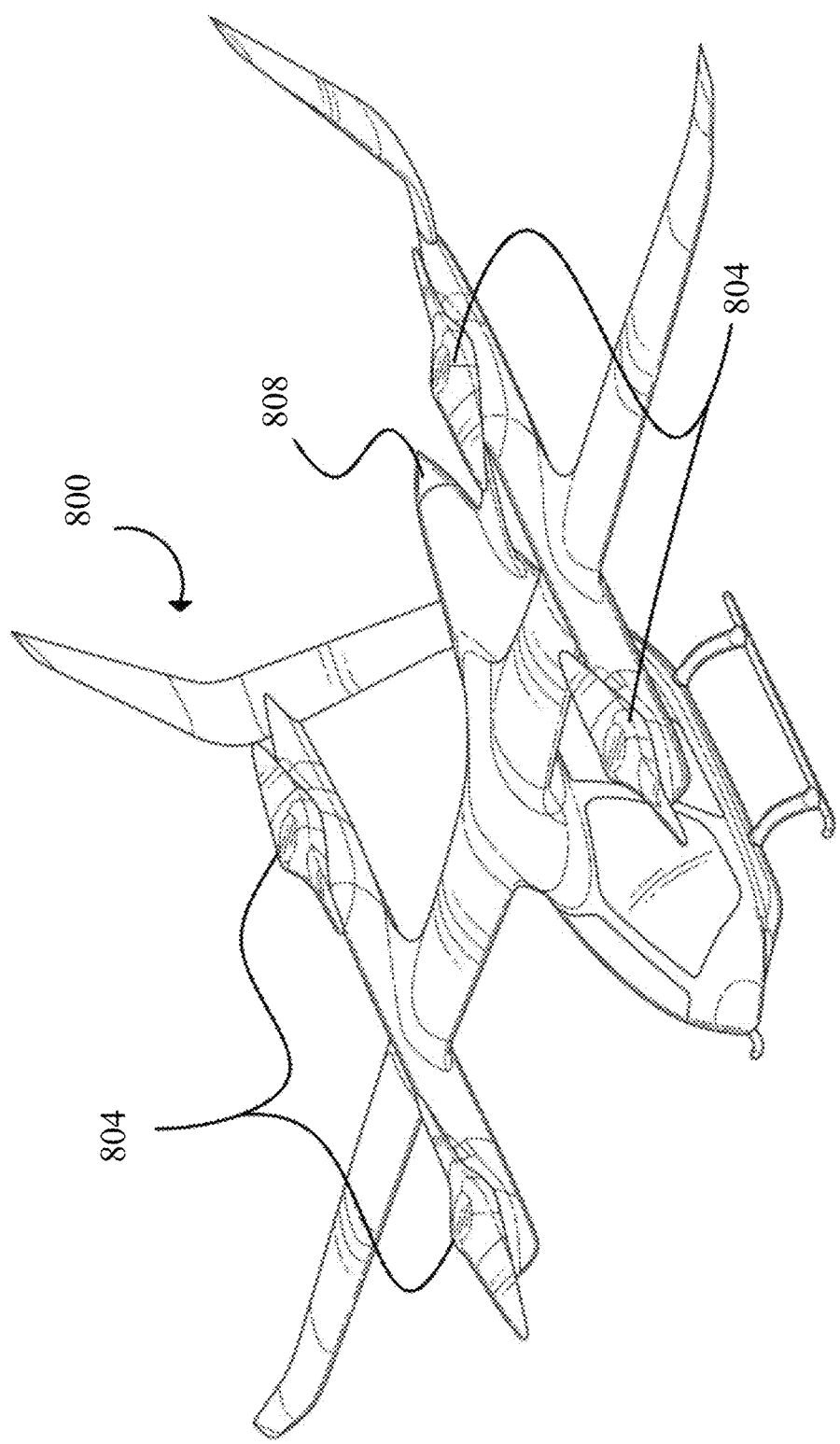
FIG. 8 is an illustration of an exemplary embodiment of an electric aircraft.

Referring now to FIG. 8, an exemplary embodiment of an aircraft 800, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 8, aircraft 800 may include an electrically powered aircraft. In embodiments, electrically powered aircraft may be an electric vertical takeoff and landing (eVTOL) aircraft. Aircraft 800 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 8.

Still referring to FIG. 8, aircraft 800 includes a fuselage 808. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 808 may include structural elements that physically support a shape and structure of an aircraft. Structural elements may take a plurality of forms, alone or in combination with other types. Structural elements may vary depending on a construction type of aircraft such as without limitation a fuselage 808. Fuselage 808 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 8, aircraft fuselage 808 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 808 orthogonal to a longitudinal (nose to tail) axis of the aircraft and may form a general shape of fuselage 808. A former may include differing cross-sectional shapes at differing locations along fuselage

808, as the former is the structural element that informs the overall shape of a fuselage 808 curvature. In embodiments, aircraft skin may be anchored to formers and strings such that the outer mold line of a volume encapsulated by formers and stringers comprises the same shape as aircraft 800 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 8, fuselage 808 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 8, fuselage 808 may include a semi-monocoque construction. Semi-monocoque construction, as used herein, is a partial monocoque construction, wherein a monocoque construction is describe above detail. In semi-monocoque construction, aircraft fuselage 808 may derive some structural support from stressed aircraft skin and some structural support from underlying frame structure made of structural elements. Formers or station frames can be seen running transverse to the long axis of fuselage 808 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 8, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 8, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 808. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 8, it should be noted that an illustrative embodiment is presented only, and this disclosure in no way limits the form or construction method of a system and method for loading payload into an eVTOL aircraft. In embodiments, fuselage 808 may be configurable based on the needs of the eVTOL per specific mission or objective. The general arrangement of components, structural elements, and hardware associated with storing and/or moving a payload may be added or removed from fuselage 808 as needed, whether it is stowed manually, automatedly, or removed by personnel altogether. Fuselage 808 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 808 may also be configurable to accept certain specific cargo containers, or a receptable that can, in turn, accept certain cargo containers.

Still referring to FIG. 8, aircraft 800 may include a plurality of laterally extending elements attached to fuselage 808. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 8, aircraft 800 includes a plurality of flight components 804. As used in this disclosure a "flight component" is a component that promotes flight and guidance of an aircraft. In an embodiment, flight component 804 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 8, plurality of flight components 804 may include at least a lift propulsor component 812. As used in this disclosure a "lift propulsor component" is a component and/or device used to propel a craft upward by exerting downward force on a fluid medium, which may include a gaseous medium such as air or a liquid medium such as water. Lift propulsor component 812 may include any device or component that consumes electrical power on demand to propel an electric aircraft in a direction or other vehicle while on ground or in-flight. For example, and without limitation, lift propulsor component 812 may include a rotor, propeller, paddle wheel and the like thereof, wherein a rotor is a component that produces torque along the longitudinal axis, and a propeller produces torquer along the vertical axis. In an embodiment, lift propulsor component 812 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 812 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 10.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 8, lift propulsor component 812 may be configured to produce a lift. As used in this disclosure a "lift" is a perpendicular force to the oncoming flow direction of fluid surrounding the surface. For example, and without limitation relative air speed may be horizontal to aircraft 800, wherein lift force may be a force exerted in a vertical direction, directing aircraft 800 upwards. In an embodiment, and without limitation, lift propulsor component 812 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 812 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 8, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 800 may be incorporated.

In an embodiment, and still referring to FIG. 8, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 8, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 8, plurality of flight components 804 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 30° from the longitudinal axis of aircraft 800. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 8, plurality of flight components 804 may include a pusher component 816. As used in this disclosure a "pusher component" is a component that pushes and/or thrusts an aircraft through a medium. As a nonlimiting example, pusher component 816 may include a pusher propeller, a paddle wheel, a pusher motor, a pusher propulsor, and the like. Additionally, or alternatively, pusher flight component may include a plurality of pusher flight components. Pusher component 816 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 800 in a horizontal direction along a longitudinal axis. As a further non-limiting example, pusher component 816 may twist and/or rotate to pull air behind it and, at the same time, push aircraft 800 forward with an equal amount of force. In an embodiment, and without limitation, the more air forced behind aircraft, the greater the thrust force with which the aircraft is pushed horizontally will be. In another embodiment, and without limitation, forward thrust may force aircraft 800 through the medium of relative air. Additionally or alternatively, plurality of flight components 804 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 8, aircraft 800 may include a flight controller located within fuselage 808, wherein a flight controller is described in detail below, in reference to FIG. 8. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 80 and one or more airfoil shapes of the laterally extending elements, wherein an airfoil is described above in detail. As a further non-limiting example, flight controller may operate the fixed-wing flight capability as a function of reducing applied torque on lift propulsor component 812. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 816. For example, and without limitation, flight controller may increase a forward thrust of 1000 kN produced by pusher component 816 to a forward thrust of 1100 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 800. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 8, flight controller may be configured to perform a reverse thrust command. As used in this disclosure a "reverse thrust command" is a command to perform a thrust that forces a medium towards the relative air opposing the aircraft. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 8, flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 9:
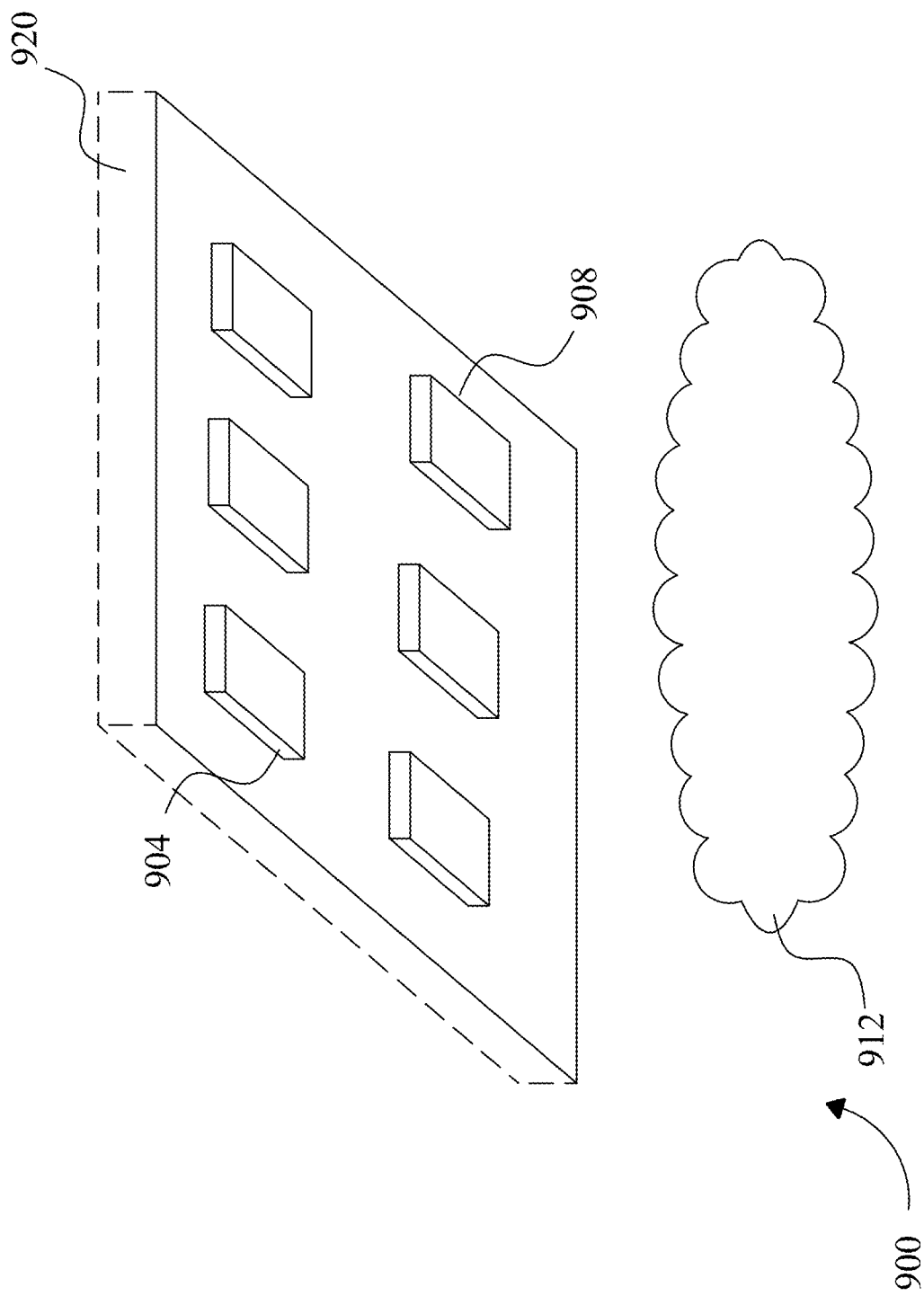
FIG. 9 is an illustration of an exemplary embodiment of a sensor suite in partial cut-off view.

Referring now to FIG. 9, an embodiment of sensor suite 900 is presented in accordance with one or more embodiments of the present disclosure. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors communicatively connected to charging component 132 measuring operating conditions of the communication such as temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 908 to detect phenomenon is maintained.

Sensor suite 900 includes a moisture sensor 904. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 904 may be psychrometer. Moisture sensor 904 may be a hygrometer. Moisture sensor 904 may be configured to act as or include a humidistat. A "humidistat", for the purposes of this disclosure, is a humidity-triggered switch, often used to control another electronic device. Moisture sensor 904 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 9, sensor suite 900 may include electrical sensors 908. Electrical sensors 908 may be configured to measure voltage of charging component 132, electrical current of charging component 132, and resistance of charging component 132. Electrical sensors 908 may include separate sensors to measure each of the previously disclosed electrical characteristics such as voltmeter, ammeter, and ohmmeter, respectively.

Alternatively or additionally, and with continued reference to FIG. 9, sensor suite 900 may include a sensor or plurality thereof that may detect voltage and direct the charging of individual battery cells of a power source according to charge level; detection may be performed using any suitable component, set of components, and/or mechanism for direct or indirect measurement and/or detection of voltage levels, including without limitation comparators, analog to digital converters, any form of voltmeter, or the like. Sensor suite 900 and/or a control circuit incorporated therein and/or communicatively connected thereto may be configured to adjust charge to one or more battery cells as a function of a charge level and/or a detected parameter. For instance, and without limitation, sensor suite 900 may be configured to determine that a charge level of a battery cell of a power source is high based on a detected voltage level of that battery cell or portion of the power source and/or battery pack. Sensor suite 900 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 900 may include digital sensors, analog sensors, or a combination thereof. Sensor suite 900 may include digital-to-analog converters (DAC), analog-to-digital converters (ADC, A/D, A-to-D), a combination thereof, and the like.

With continued reference to FIG. 9, sensor suite 900 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 900, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 9, sensor suite 900 may include a sensor configured to detect gas that may be emitted during or after a cell failure. "Cell failure", for the purposes of this disclosure, refers to a malfunction of a battery cell of a power source, which may be an electrochemical cell, that renders the cell inoperable for its designed function, namely providing electrical energy to at least a portion of an electric aircraft. Byproducts of cell failure 912 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 900, may be configured to detect combustible, flammable, toxic, oxygen depleted, a combination thereof, or another type of gas alone or in combination. The gas sensor that may be present in sensor suite 900 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 900 may include sensors that are configured to detect non-gaseous byproducts of cell failure 912 including, in non-limiting examples, liquid chemical leaks including aqueous alkaline solution, ionomer, molten phosphoric acid, liquid electrolytes with redox shuttle and ionomer, and salt water, among others. Sensor suite 900 may include sensors that are configured to detect non-gaseous byproducts of cell failure 912 including, in non-limiting examples, electrical anomalies as detected by any of the previous disclosed sensors or components.

With continued reference to FIG. 9, sensors 908 may be disposed on a sense board 916. In one or more embodiments, sense board 916 may include opposing flat surfaces and may be configured to cover a portion of a battery module within a power source, such as a battery pack. Sense board 916 may include, without limitation, a control circuit configured to perform and/or direct any actions performed by sense board 916 and/or any other component and/or element described in this disclosure. Sense board 916 may be consistent with the sense board disclosed in U.S. patent application Ser. No. 16/948,140 entitled, "SYSTEM AND METHOD FOR HIGH ENERGY DENSITY BATTERY MODULE" and incorporated herein by reference in its entirety.

With continued reference to FIG. 9, sensor suite 900 may be configured to detect events where voltage nears an upper voltage threshold or lower voltage threshold. The upper voltage threshold may be stored in a memory of, for example, a computing device for comparison with an instant measurement taken by any combination of sensors present within sensor suite 900. The upper voltage threshold may be calculated and calibrated based on factors relating to battery cell health, maintenance history, location within battery pack, designed application, and type, among others. Sensor suite 900 may measure voltage at an instant, over a period of time, or periodically. Sensor suite 900 may be configured to operate at any of these detection modes, switch between modes, or simultaneous measure in more than one mode. Sensor 98 may detect through sensor suite 900 events where voltage nears the lower voltage threshold. The lower voltage threshold may indicate power loss to or from an individual battery cell or portion of the battery pack. Sensor 98 may detect through sensor suite 900 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation. Additional disclosure related to a battery management system may be found in U.S. patent application Ser. Nos. 17/111,002 and 17/108,798 entitled "SYSTEMS AND METHODS FOR A BATTERY MANAGEMENT SYSTEM INTEGRATED IN A BATTERY PACK CONFIGURED FOR USE IN ELECTRIC AIRCRAFT", both of which are incorporated in their entirety herein by reference.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 10:
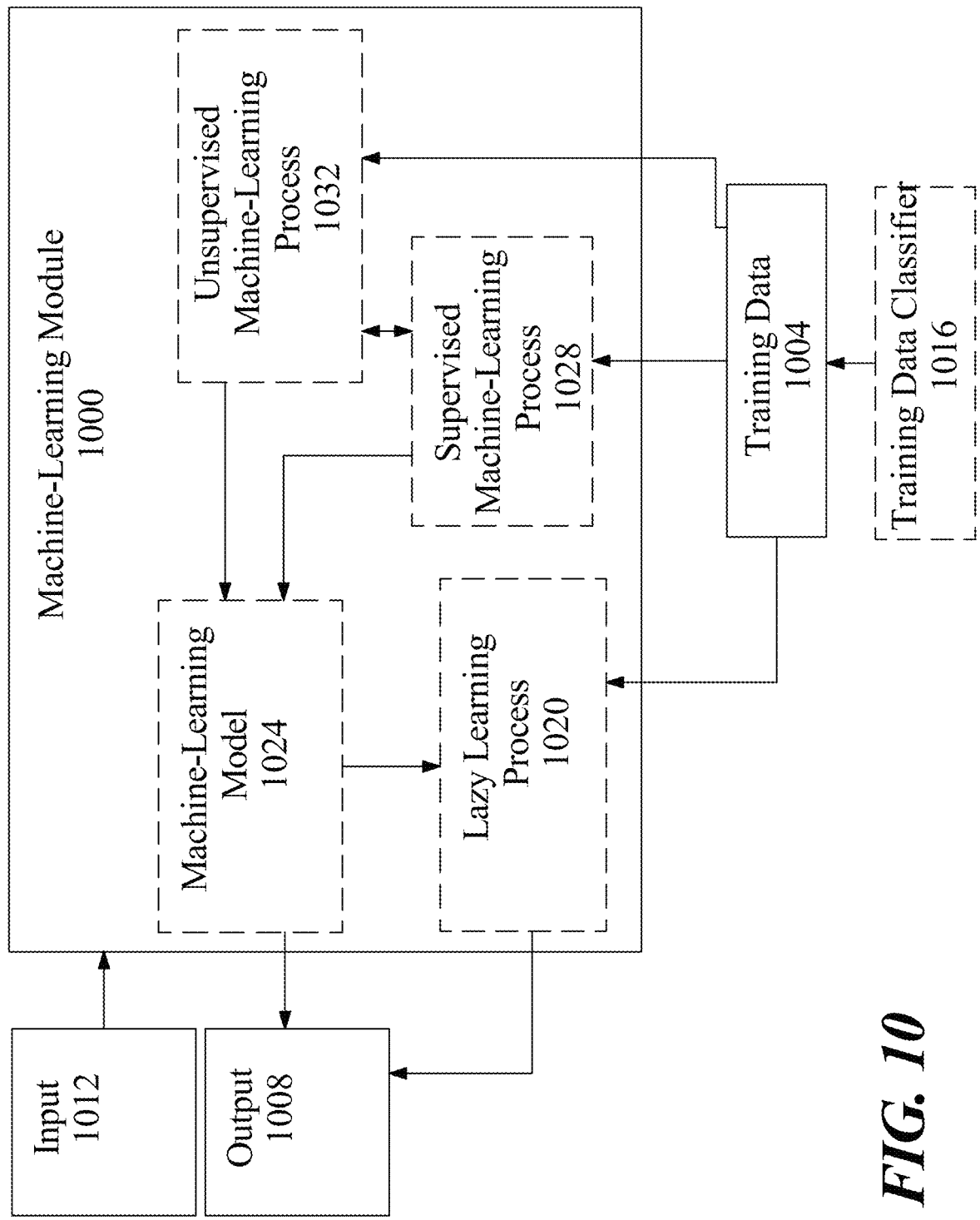
FIG. 10 is a block diagram of an exemplary machine-learning process.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example the residual element may be an input for an output of the alert datum. In another non-limiting example, the alert datum may be an input for the output of the security measure.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to various levels of trip class, levels of severity of the residual element, and the like thereof, for which a subset of training data may be selected.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs as described above as inputs, any outputs as described about as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
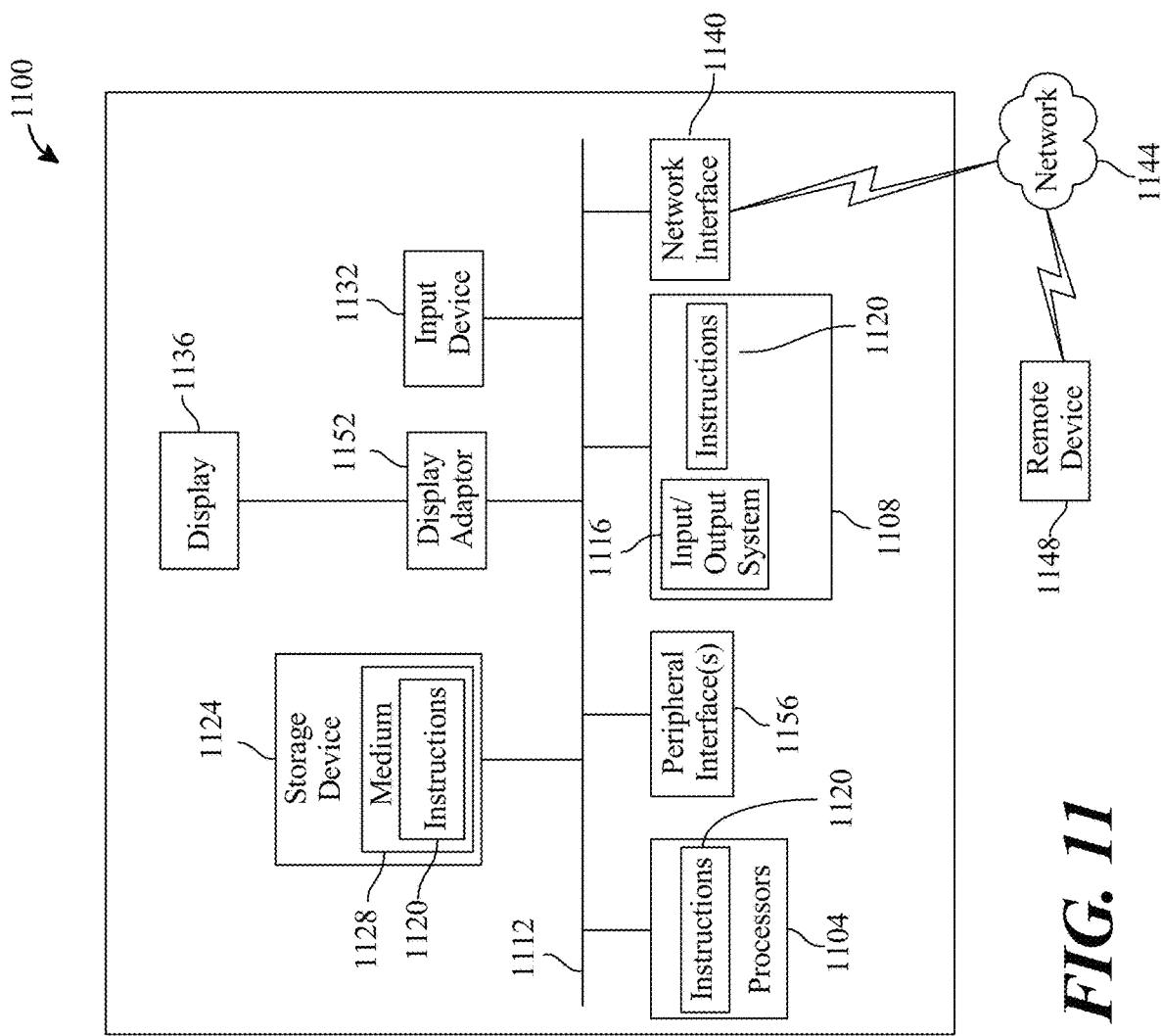
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for managing residual energy in a charging component, the system comprising:
    a charging component electrically connected to a battery pack;
    a sensor communicatively connected to the charging component, wherein the sensor is configured to:
        detect an electrical parameter of the charging component or the electrically connected battery pack; and
        generate a residual datum as a function of the electrical parameter;
    a computing device communicatively connected to the charging component and the sensor, the computing device configured to:
        identify a residual element as a function of the residual datum generated by the sensor;
        determine a severity of the residual element;
        generate an alert datum as a function of the residual element; and
        select and execute at least one security measure of a plurality of security measures as a function of the alert datum and the severity of the residual element.

2. The system of claim 1, wherein the at least one security measure further comprises relaying information about the residual element to a user.

3. The system of claim 1, wherein the computing device is further configured to determine the residual element using a residual threshold.

4. The system of claim 1, wherein the at least one security measured is executed as a function of a trip class.

5. The system of claim 1, wherein the computing device is configured to operate in a first mode, wherein the first mode is configured to execute the at least one security measure on an electric aircraft.

6. The system of claim 5, wherein the first mode is further configured to terminate one or more connections of a battery component to its neighboring battery components, as a function of the identification of the residual element.

7. The system of claim 1, wherein the computing device is configured to operate in a second mode, wherein the second mode is configured to execute the at least one security measure on the charging component.

8. The system of claim 7, wherein the second mode is further configured to trip the charging component in the event that the residual element is identified within the charging component based on a trip class.

9. The system of claim 1, wherein the residual element comprises a leakage current.

10. A method for managing residual energy in a charging component, wherein the method comprises:
    detecting, by a sensor communicatively connected to a charging component, an electrical parameter of the charging component or an electrically connected battery pack;
    generating, by the sensor, a residual datum as a function of the electrical parameter;
    identifying, by a computing device, a residual element as a function of the residual datum generated by the sensor;
    determining a severity of the residual element;
    generating, by the computing device, an alert datum as a function of the residual element; and
    executing, by the computing device, at least one security measure of a plurality of security measures as a function of the alert datum and the severity of the residual element.

11. The method of claim 10, wherein the executing the at least one security measure further comprises relaying information about the residual element to a user.

12. The method of claim 10, further comprising determining, by the computing device, the residual element using a residual threshold.

13. The method of claim 10, wherein executing the at least one security measure further comprises executing as a function of a trip class.

14. The method of claim 10, further comprising operating, by the computing device, in a first mode, wherein the first mode is configured to execute the at least one security measure on an electric aircraft.

15. The method of claim 14, further comprising terminating, by the computing device operating in the first mode, one or more connections of a battery component to its neighboring battery components, as a function of the identification of the residual element.

16. The method of claim 10, further comprising operating, by the computing device, in a second mode, wherein the second mode is configured to execute the at least one security measure on the charging component.

17. The method of claim 16, further comprising tripping, by the computing device operating in a second mode, the charging component in the event that the residual element is identified within the charging component based on the trip class.

18. The method of claim 10, wherein receiving the residual datum further comprises receiving a leakage current.

\* \* \* \* \*